United States Patent [19]

Jamison et al.

[11] Patent Number: 4,623,472
[45] Date of Patent: Nov. 18, 1986

[54] THERMOSET MICROPOROUS POLYMER LUBRICATING COMPOSITION AND METHOD FOR FORMING THE SAME

[75] Inventors: Warren E. Jamison, Edmonds, Wash.; Dean P. Stull, Longmont, Colo.; Franklin H. Guzzetta, Middletown, Ohio

[73] Assignee: Armco, Inc., Middletown, Ohio

[21] Appl. No.: 720,518

[22] Filed: Apr. 5, 1985

[51] Int. Cl.$^4$ .......................................... C10M 149/20
[52] U.S. Cl. ................................ 252/12.2; 252/56 S; 252/51; 252/52 R
[58] Field of Search ..................... 252/12, 12.2, 51, 52, 252/56 S

[56] References Cited

U.S. PATENT DOCUMENTS

| | | | |
|---|---|---|---|
| 3,808,129 | 4/1974 | Lindlof et al. | 252/12 |
| 3,809,442 | 5/1974 | Peterson et al. | 252/12 |
| 4,011,189 | 3/1977 | Keil | 252/12 |
| 4,486,319 | 12/1984 | Jamison | 252/12.2 |

Primary Examiner—Jacqueline V. Howard
Attorney, Agent, or Firm—Robert E. Harris

[57] ABSTRACT

Thermoset microporous polymer lubricating compositions and methods for forming the same are disclosed. Each thermoset composition disclosed includes a thermosetting polymer that is formed into a microporous matrix capable of receiving a lubricating oil in the interconnected microscopic pores of the matrix during formation thereof, with the lubricating oil being thereafter retained in the pores until released through capillary draw, externally applied forces or elevated temperatures. Thermosetting polymers are set forth utilizing a number of different thermosetting resins, among which are polyurethanes that include an isocyanate (such as a diisocyanate), a polyol (such as a polyether-based polyol or a polyester-based polyol), and a catalyst (such as an amine or a metal salt) for forming a polyurethane polymer matrix the pores of which are filled with lubricating oil (such as a mineral oil or an ester-based synthetic oil), with surface energy modifiers (such as emulsifiers and foaming agents) also being utilized in some formulations to promote interconnected pore formation. The polyurethane matrix is formed by mixing the lubricating oil, catalyst and surface energy modifiers (if used) with the polyol to form an initial mixture, thereafter mixing the initial mixture with the isocyanate to form a final mixture, and then pouring the final mixture into a mold or utilization device (such as a bearing) where the final mixture is allowed to cure to thus form the polyurethane polymer matrix the pores of which are filled with the lubricating oil.

30 Claims, 20 Drawing Figures

SAMPLE 17-100X

SAMPLE 17-100X

SAMPLE 17-500X

SAMPLE 17-1000X

SAMPLE 15-100X

SAMPLE 15-500X

SAMPLE 15-1000X

SAMPLE BCI-200X

SAMPLE BCI-500X

SAMPLE 3-500X

THERMOSET MICROPOROUS POLYMER LUBRICATING COMPOSITION AND METHOD FOR FORMING THE SAME

FIELD OF THE INVENTION

This invention relates to a lubricating composition and method, and, more particularly, relates to a thermoset microporous polymer lubricating system and a method for forming the same.

BACKGROUND OF THE INVENTION

Lubricating compositions have heretofore been suggested and/or utilized for many diverse applications. While lubricating oils have heretofore been successfully utilized for at least some such diverse applications, it has been found that continuing and/or effective lubrication for many applications could not be adequately achieved, such as, for example, for lubrication of bearings and/or where adverse conditions were encountered.

While attempts have also been heretofore made to provide application of lubricating oils over extended periods by provision of various oil retainers and/or providing greases in place of oils, such attempts have not met with complete success, particularly in providing continuing and effective lubrication to more difficult areas, such as, for example, for lubricating machine elements such as rolling element bearings, sliding bearings of all types, wire ropes and power transmission devices such as screws, chain drives and gears.

More recently, microporous polymer structures have been suggested and utilized for receiving and retaining lubricating oils. Such structures are shown, for example, in U.S. Pat. Nos. 4,342,491 and 4,344,278, with lubricating compositions for such structures being shown, for example, in U.S. Pat. Nos. 3,541,011, 3,547,819, 3,729,415, 4,146,487 and 4,239,632.

While such microporous polymer lubricating structures have been found to be useful and have fulfilled a need for many applications, further improvements to such compositions are felt to be still warranted to fulfill needs that can be uniquely accomplished by forming such structures through use of thermosetting materials which provide heretofore unavailable advantages such as, for example, in-situ formation utilizing processing with chemicals without heat treatment or high pressures, using low cost formulation equipment and/or providing structures with better high temperature properties than have heretofore been possible.

SUMMARY OF THE INVENTION

This invention provides a thermoset microporous lubricating composition and method for forming the same that is capable of being formed in-situ, can provide better high temperature properties than has heretofore been possible, and may be formed with low cost mixing, metering and dispensing equipment without requiring high temperatures or pressures.

The composition is basically formulated from a thermoset polymer that is formed into a matrix with interconnected microscopic pores that receive and retain a lubricating oil present during pore formation.

The thermosetting polymer now believed to be preferable includes a polyurethane polymer formed from an isocyanate, a polyol, and a catalyst, along with a surface energy modifier in some instances, with the composition being preferably formed by first mixing the lubricating oil to be utilized with the catalyst, the polyol and the surface energy modifier, if utilized, and then incorporating this initial mixture into the isocyanate to form a final mixture which is placed in a utilization device (such as, for example, a bearing) or in a mold where the microporous polyurethane matrix is formed with the interconnected microscopic pores of the thus formed matrix having the lubricating oil received and retained therein.

The thermosetting polymer may also be formed from other thermosetting resins, including epoxies, polyesters, silicones, and polyester resin-polyether elastomer hybrids, with the systems also including a curing agent and, in some cases, a surface energy modifier to form a polymer matrix with interconnected microscopic pores to receive and retain lubricating oils.

It is therefore an object of this invention to provide a thermoset microporous polymer lubricating composition and method for forming the same.

It is another object of this invention to provide a thermoset microporous polymer lubricating composition that is readily formed utilizing low cost equipment and requires no special heat treatment or high pressures in forming the composition.

It is still another object of this invention to provide a thermoset microporous polymer lubricating composition with superior high temperature properties.

It is another object of this invention to provide a thermoset microporous polymer lubricating composition that may be formed in-situ.

It is still another object of this invention to provide a thermoset microporous polymer lubricating composition that includes a thermosetting polymer and a lubricating oil.

It is still another object of this invention to provide a thermoset microporous polymer lubricating composition that has a mechanically sound matrix with interconnected microscopic pores for receiving and retaining a lubricating oil therein.

It is still another object of this invention to provide a thermoset microporous polymer lubricating composition that is formed from a thermosetting polymer that includes a polyurethane, an epoxy, a silicone, a polyester, or a polyester resin-polyether elastomer hybrid.

It is yet another object of this invention to provide a thermoset microporous polymer lubricating composition formed from a thermosetting polymer, a catalyst and a surface energy modifier.

It is another object of this invention to provide a thermoset microporous polymer lubricating composition formed from a polyurethane polymer comprising an isocyanate, a polyol, and a catalyst.

It is still another object of this invention to provide a method for forming a thermoset microporous polymer lubricating composition that includes initially mixing the lubricating oil with a polyol and a surface energy modifier, if utilized, incorporating the initial mixture into the isocyanate to form a final mixture, and placing the final mixture in a mold or utilization device to form the composition thereat.

With these and other objects in view, which will become apparent to one skilled in the art as the description proceeds, this invention resides in the novel construction, combination, arrangement of parts and method substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings, together with the specification, illustrate a complete embodiment of the invention according to the best mode so far devised for the practical application of the principles thereof, and in which.

DESCRIPTION OF THE INVENTION

Figure 1A:
FIGS. 1 (*a* through *c*), and 2 (*a* through *c*), 3 (*a* and *b*) and 4 are depictions of SEM photomicrographs illustrating pore structures for samples designated 17, 15, BC1, and 3, respectively.

The composition of this invention is a thermoset microporous polymer lubricating composition that includes a thermosetting polymer formed into a matrix having interconnected microscopic pores that receive and retain a lubricating oil that is incorporated into the mixture prior to formation of the matrix.

The thermosetting polymer may be any polymer capable of being formed into a structure, or matrix, having a plurality of interconnected microscopic pores therein, which pores are preferably uniformly distributed for receiving and retaining the lubricating oil.

The pore dimensions within the matrix determines the amount of oil that can be received and retained with a greater pore area allowing receipt and storage of larger amounts of lubricating oil. While it is desirable to store as much lubricant as possible within the composition, excessive lubricant content weakens the matrix structure. Therefore, it is normally necessary that the pores having sufficiently small dimensions so that the mechanical integrity of the matrix is retained and so that the oil is not too freely expelled from the matrix. It is presently believed that a pore diameter of between about 1 and 10 microns will be most effective for the matrix pores of compositions of this invention. It has also been found, however, that compositions containing between 40 and 60 percent by weight of lubricating oil can be formulated and utilized for at least some applications that require less mechanical matrix strength to resist the external forces which arise during use, and that adequate oil can therefore be provided in such applications to perform the needed lubricating function. Thus, it can be expected that where a particular application requires even less matrix strength and more lubricating oil, compositions containing up to 80% or more oil could be formulated and utilized, while particular applications requiring greater strength and less lubrication oil, could best be satisfied by formulating compositions containing only about 10% oil.

The thermosetting polymer may be formed, for example, from a thermosetting plastic such as a urethane, and may also be formed from epoxies, polyesters, silicones and hybrid systems such as a system consisting of a polyester resin and a polyether elastomer, with examples of each being specifically set forth hereinafter. In each case, the thermosetting plastic utilized must be a thermosetting plastic that will combine with the other selected components to form the interconnected microscopic pores.

The components of the composition are combined in proportions as described hereinafter. The isocyanate and polyol or polyols are combined in the proportions which are customary for producing cast urethane materials using near stoichiometric ratios of isocyanate to polyol, and lubricating oil is added in the range of about 5% to 60% oil. If, however, the lubricating oil or other additives have functional groups which enter into the chemical reaction, the isocyanate/polyol concentrations must be adjusted accordingly. Notably, the ester lubricants described in the compositions listed hereinafter require the addition of extra isocyanate to react with the hydroxyl groups on some of the lubricant molecules. Accelerator and catalyst concentrations must be adjusted to give adequate working time, particularly when the mixing and mold-filling are being done by hand. Other additive concentrations are those normally used with the components involved. In addition, it has been found that surface energy modifiers, such as emulsifiers or foaming agents, are preferably included in some formulations to enhance (or in some cases cause) adequate pore formulation.

This invention also includes a method for preparing a polyurethane composition to perform its lubricating function. In practice, the components of each composition to be formulated may be combined into two packages, which are kept separated until it is desired to create the thermoset microporous polymer lubricating composition. One package contains the isocyanate, and the other package contains the appropriate amounts of the polyol, the catalyst, the lubricating oil and all other additives (if any), including surface energy modifiers.

The composition is formed by starting with liquid ingredients, or components, that can be mixed and caused to flow into openings or cavities (either molds or cavities in actual machine elements) wherein a low temperature reaction is created to form a solid mass of polymer which contains a network of interconnecting microscopic pores, or channels, that are filled with the lubricating oil present at the time of pore formation. The oil is retained in the pores of the polymer matrix until such time as is needed for lubrication, at which time it is released through capillary draw, externally applied forces, or elevated temperatures.

It is presently believed that polyurethane can best be utilized for forming a thermoset microporous polymer lubricating composition. The polyurethane polymer system comprises an isocyanate, a polyol and a suitable catalyst to form a polyurethane polymer matrix having interconnected microscopic pores for receipt and retention of the lubricating oil therein. Additives, including surface energy modifiers, may also be utilized to modify the mechanical, physical and lubricating properties of the system.

With respect to the isocyanate, it has been found that a diisocyanate can be utilized, with methylene diisocyanate (MDI) having been specifically utilized, although it is believed that tolulene diisocyanate (TDI), hexamethylene diisocyanate (HDI), and napthalene diisocyanate (NDI) can also be utilized.

With respect to methylene diisocyanate (MDI), the following have been effectively utilized: Mobay Multrathane E-410; Mobay Multrathane F-242; Upjohn Isonate 181 (I-181); Upjohn Isonate 240 (I-240); Dupont Adiprene LW570 and Isonol 93 (I-93). In addition, Mobay Des Modur L-2291A (Aliphatic Isocyanate) has also been utilized.

With respect to polyols, the polyols may be an ether (such as polyethylene glycol), an ester of adipic acid, phthalic anhydride or a similar compound or mixtures of several of such materials, and may include additional glycols, triols, hydroquinone or pentaerythritol as reaction modifiers. The following polyols have been effectively utilized: Polyether Polyols-Dow Voranol 2070 (D-2070), Dow Voranol 2103 (D-2103) and Dow Voranol 4301 (D-4301); Polyether Glycols-DuPont Terecol 1500 (TE-1500) and DuPont Terecol 2000 (TE-2000); Diethyline Adipates-Whitco Fomrez 11-112 (W11-112) and Whitco Fomrez 11-225 (W11-225). In addition, Rexnord 129-42, Nordbak 90A (N-90A) Rexnord, Upjohn PAPI, propanediol (ppd), Dupont Caytur 21 (Cay-21), and Emory 2873 (E-2873) have also been utilized.

With respect to catalysts, the catalyst may be an amine (such as triethyl amine, triethylene diamine or aniline) a metal salt (such as stannous chloride, di-n-butyl tin dilaurate, stannous octoate, or zinc napthanate) or a mixture of an amine and a metal salt. The following catalysts have been effectively utilized: Abbott Polycat SA-102 (delayed action amine), Air Products Dabco DC-1 (delayed action amine), Air Products Dabco 33-LV (amine), and Whitco Fomrez C-2 (stannous octoate).

With respect to lubricating oils, such oils may be mineral oil, synthesized hydrocarbon, ester-based oil, silicone oil, and blends thereof. The following lubricating oils have been effectively utilized: Paraffinic 325SN (Para), Emery 2900 (E2900), Emery 2905 (E2905), Emery 2935 (E2935), Emery 2983 (E2983), Emery 2964-A (E-2964), GE SF 96-350 silicone (Silicon), and Anderol. Oil additives have been effectively utilized as follows: Van Lub 73 (oil additive), NaSul BSN (oil additive), $MoS_2$ (solid lube), and hydroquinone (chain extender).

With respect to emulsifiers as surface energy modifiers, modifiers such as nonionic surfactants like N,N',N'-polyoxyethylene(10)-N-tallow-1,3-propanediamine (sold as Ethodicomene T/20 by Ormak Company), and stearyl hydroxy imidazole (sold as Chemasine S by Chemax, Inc.), and fatty acid anionic surfactants like lauric and caprylic acid as believed to be useable, and emulsifiers serving as surface energy modifiers are included in the Rexnord 129-42 system.

Numerous formulations (including different isocyanates, polyols, catalysts and lubricating oils, as well as different proportions thereof) were attempted in forming useful polyurethane compositions utilizing the above-listed components with many such formed compositions failing due to oil separation, and/or mechanical structure failure. A listing of composition believed to have merit is set forth in Tables IA and IB as follows:

TABLE IA

| Sample Code | Isocyanate/phr | polyol/phr | Catalyst/ml/hr | Oil/phr/% |
|---|---|---|---|---|
| 1 | I-240/100 | D-2070/103.3 | C-2/3.2 | E2964/88.5/30% |

TABLE IA-continued

FORMULATION

| Sample Code | Isocyanate/phr | polyol/phr | Catalyst/ml/hr | Oil/phr/% |
|---|---|---|---|---|
| 2 | I-240/100 | D-2103/410.7 | C-2/3.2 | Para/275.0/35% |
| 3 | I-240/100 | D-2103/410.7 | C-2/3.2 | E2905/276.7/35% |
| 4 | I-240/100 | D 2103/410.7 | C-2/3.2 | Para/301.8/37% |
| 5 | I-240/100 | D-2103/410.7 | C-2/3.2 | 95% Para 05% E2905/301.8/37% |
| 6 | I-240/100 | W11-225/105.5 | C-2/3.2 | Para/112.4/35% |
| 7 | I-240/100 | TE-2000/405.0 | C-2/3.2 | Para/273.6/35% |
| 8 | I-181/100 | D-2103/509.9 | C-2/4.0 | Para/263.1/30% |
| 9 | I-181/100 | D-2103/509.9 | C-2/4.0 | E2905/263.1/30% |
| 10 | I-181/100 | D-2103/509.9 | C-2/4.0 | E2964/263.1/30% |
| 11 | I-181/100 | W11-112/261.6 | C-2/4.0 | E2905/156.7/30% |
| 12 | I-181/100 | W11-225/130.7 | C-2/4.0 | E2905/100.6/30% |
| 13 | I-181/100 | TE-1500/378.1 | C-2/4.0 | Para/206.6/30% |
| 14 | I-181/100 | TE-2000/502.8 | C-2/4.0 | Para/260.1/30% |
| 15 | I-181/100 | D-2103/509.9 | C-2/4.0 | E2964/409.3/40% |
| 16 | I-181/100 | D-2103/509.9 | C-2/4.0 | E2905/502.3/45% |
| 17 | I-181/100 | W11-225/130.7 | C-2/4.0 | 75% Para 25% E2964/156.5/40% |
| 18 | I-181/100 | TE-1500/378.1 | C-2/4.0 | Para/259.6/35% |
| 19 | E-410/100 | D-2103/199.9 | C-2/2.0 | Para/129.4/30% |
| 20 | E-410/100 | D-2103/199.9 | C-2/2.0 | E2905/129.4/30% |
| 21 | E-410/100 | W11-112/102.6 | C-2/2.0 | E2905/87.7/30% |
| 22 | E-410/100 | W11-225/51.2 | C-2/2.0 | E2964/65.7/30% |
| 23 | E-410/100 | TE-1500/148.3 | C-2/2.0 | Para/107.3/30% |
| 24 | E-410/100 | D-2103/199.9 | C-2/4.0 | E2905/201.3/40% |
| 25 | E-410/100 | D-2103/199.9 | C-2/4.0 | 50% Para/ 50% E2905/162.5/35% |
| 26 | E-410/100 | D-2070/50.3 | C-2/1.5 | 75% Para/ 25% E2905/65.3/30% |
| 27 | E-410/100 | D-2070/50.3 | C-2/1.5 | 75% Para/ 25% E2905/81.5/35% |
| 28 | L-2291A/100 | D-2070/128.5 | C-2/4.0 | E2964/99.6/30% |
| 29 | L-2291A/100 | D-2103/511.0 | C-2/8.0 | E2964/263.6/30% |
| 30 | L-2291A/100 | D-2103/511.0 | C-2/4.0 | Para/311.2/35% |
| 31 | I-240/100 | D-2070/103.3 | DC-1/6.4 | Para/89.4/30% |
| 32 | I-240/100 | D-2070/103.3 | DC-1/6.4 | Para/112.9/35% |
| 33 | I-240/100 | TE-1500/304.5 | SA-102/20.0 | Para/181.9/30% |
| 34 | I-240/100 | D-2103/410.7 | SA-102/6.4 | Para/278.4/35% |
| 35 | I-240/100 | W11-225/105.5 | SA-102/3.2 | E2905/112.4/35% |
| 36 | I-181/100 | W11-112/261.6 | SA-102/4.0 | E2964/156.7/35% |
| 37 | I-181/100 | W11-225/130.7 | SA-102/4.0 | E2964/100.6/30% |
| 38 | I-181/100 | TE-2000-502.8 | SA-102/4.0 | Para/260.1/30% |
| 39 | I-240/100 | D-2070/103.3 | C-2/3.2 | 30% Silicon 70% Para/88.5/30% |
| 40 | I-240/100 | D2070/103.3 | C-2/3.2 | 30% Silicon 70% Para/91.0/20.6% |
| 41 | I-240/100 | D-2070/103.3 | 33LV/6.4 | Para/89.4/30% |
| 42 | I-240/100 | W11-225/105.5 | 33LV/3.2 | Para/102.8/33% |
| 43 | I-181/100 | D-2070/128.3 | 33LV/4.0 | Para/125.1/30% |
| 44 | I-181/100 | W11-225/130.7 | 33LV/4.0 | Para/126.4/35% |
| 45 | E-410/100 | E-2873/120.2 | C-2/2.0 | Para/119.6/35% |
| 46 | L-2291A/100 | E-2873/307.1 | C-2/4.0 | Para/176.2/35% |
| 47 | I-181/100 | D-2103/509.9 | C-2/8.0 | E2964/409.3/40% |

TABLE IA-continued

FORMULATION

| Sample Code | Isocyanate/phr | polyol/phr | Catalyst/ml/hr | Oil/phr/% |
|---|---|---|---|---|
| 48 | I-181/100 | D-2103/509.9 | C-2/8.0 | E2964/409.3/39% |
| 49 | I-181/100 | D-2070/117.7 | C-2/3.7 | E2964/91.4/29% |
| 50 | I-181/20 | N-90A/32 | DC-1/5.0 | Anderol/70 Hydroquinone (Chain Extender)/2.0 |
| 51 | I-93/10 | PAPI/15 | DC-1/1.0 | Min Mix/25 |
| 52 | I-93/10 | PAPI/15 | DC-1/1.0 | Min Mix/20 Min Oil/20 |
| 53 | I-93/10 | PAPI/15 | DC-1/1.0 | Min Mix/25 Min Oil/10 |
| 54 | E-410/25 | D-4301/50 | C-2/0.2 | Para/38 |
| 55 | E-410/25 | D-4301/35 | C-2/0.2 | Para/38 |
| 56 | E-410/25 | D-4301/25 | C-2/0.2 | Para/38 |
| 57 | F-242/25 | ppd/5.7 | C-2/0.2 | Para/60 |
| 58 | LW-570/100 | Cay-21/36 | Glycerol/0.5 | Para/70/54.3% |
| 59 | I-181/21.5 g | Rexnord 129-42/23.1 g | In 129-42 | E2935/60/57% |
| 60 | I-181/26.7 g | Rexnord 129-42/23.1 g | In 129-42 | E2900/60/54.6% |
| 61 | I-181/26.7 g | Rexnord 129-42/23.1 g | In 129-42 | 75% E2935 25% E2983 160/54.6% |
| 62 | I-181/37.1 g | Rexnord 129-42/23.1 g | In 129-42 | E2905/60/49.9% |

TABLE IB

EVALUATION

| Sample Code | Compressive Modulus | Tear Strength | Oil Availability |
|---|---|---|---|
| 1 | Spongy | Good | Available |
| 2 | Spongy | Good | Contained |
| 3 | Spongy | Good | Contained |
| 4 | Spongy | Low | Available |
| 5 | Spongy | Good | Contained |
| 6 | Spongy | Good | Available |
| 7 | Spongy | Good | Available |
| 8 | Spongy | Good | Contained |
| 9 | Spongy | Good | Contained |
| 10 | Spongy | Good | Contained |
| 11 | Spongy | Good | Available |
| 12 | Semi-rigid | Good | Available |
| 13 | Spongy | Good | Contained |
| 14 | Spongy | Good | Contained |
| 15 | Spongy | Good | Contained |
| 16 | Spongy | Good | Contained |
| 17 | Semi-spongy | Good | Available |
| 18 | Spongy | Good | Available |
| 19 | Spongy | Good | Contained |
| 20 | Spongy | Good | Contained |
| 21 | Spongy | Good | Available |
| 22 | Spongy | Fair | Available |
| 23 | Spongy | Fair | Available |
| 24 | Spongy | Good | Contained |
| 25 | Spongy | Good | Contained |
| 26 | Semi-spongy | Good | Available |
| 27 | Spongy | Good | Available |
| 28 | Rigid | Good | Contained |
| 29 | Semi-rigid | Fair | Contained |
| 30 | Semi-spongy | Fair | Contained |
| 31 | Semi-spongy | Good | Available |
| 32 | Spongy | Good | Available |
| 33 | Spongy | Low | Available |
| 34 | Spongy | Good | Contained |
| 35 | Spongy | Fair | Available |
| 36 | Spongy | Fair | Available |
| 37 | Semi-rigid | Good | Available |
| 38 | Semi-rigid | Good | Contained |
| 39 | Rigid | Good | Contained |
| 40 | Very Spongy | Low | Available |
| 41 | Semi-rigid | Good | Available |
| 42 | Semi-spongy | Good | Available |
| 43 | Rigid | Good | Available |
| 44 | Rigid | Good | Available |
| 45 | Spongy | Fair | Contained |
| 46 | Semi-spongy | Fair | Contained |
| 47 | Spongy | Good | Contained |
| 48 | Spongy | Good | Contained |
| 49 | Rigid | Good | Contained |
| 50 | Flexible | Good | 54.3% |
| 51 | N/A | N/A | 45% |
| 52 | N/A | N/A | 58% |
| 53 | N/A | N/A | 56% |
| 54 | N/A | N/A | Available |
| 55 | N/A | N/A | Available |
| 56 | N/A | N/A | Available |
| 57 | N/A | N/A | Available |
| 58 | N/A | N/A | Available |
| 59 | N/A | Rigid, Good Strength | 48.5% |
| 60 | N/A | Rigid, Somewhat Brittle | 53.2% |
| 61 | N/A | Rigid, Good Strength | 40.6% |
| 62 | N/A | Rigid, Very Brittle | 46.9% |

A listing of composition formulated, but now believed to be secondary in merit to those listed in Table IA and Table IB, are as follows:

TABLE IC

FORMULATION

| Sample Code | Isocyanate/phr | polyol/phr | Catalyst/ml/hr | Oil/phr/% |
|---|---|---|---|---|
| 63 | I-240/100 | D-2103/410.7 | C-2/3.2 | Para/218.9/30% |
| 64 | I-240/100 | D-2103/410.7 | C-2/3.2 | E2905/218.9/30% |
| 65 | I-240/100 | D-2103/410.7 | C-2/3.2 | E2964/218.9/30% |
| 66 | I-240/100 | D-2070/103.3 | C-2/3.2 | Para/88.5/30% |
| 67 | I-240/100 | D-2070/103.3 | C-2/3.2 | E2905/88.5/30% |
| 68 | I-240/100 | D-800/29.7 | C-2/3.2 | Para/57.0/30% |
| 69 | I-240/100 | W11-112/211.2 | C-2/3.2 | Para/134.8/30% |
| 70 | I-240/100 | W11-112/211.2 | C-2/3.2 | E2905/134.8/30% |
| 71 | I-240/100 | W11-112/211.2 | C-2/3.2 | E2964/134.8/30% |
| 72 | I-240/100 | W11-225/105.5 | C-2/3.2 | Para/89.4/30% |
| 73 | I-240/100 | W11-225/105.5 | C-2/3.2 | E2905/89.4/30% |
| 74 | I-240/100 | W11-225/105.5 | C-2/3.2 | E2964/89.4/30% |
| 75 | I-240/100 | TE1500/304.5 | C-2/3.2 | Para/174.7/30% |
| 76 | I-240/100 | TE1500/304.5 | C-2/3.2 | E2905/174.4/30% |
| 77 | I-240/100 | TE1500/304.5 | C-2/3.2 | E2964/174.7/30% |
| 78 | I-240/100 | TE2000/405.0 | C-2/3.2 | Para/217.8/30% |
| 79 | I-240/100 | TE2000/405.0 | C-2/3.2 | E2905/217.8/30% |
| 80 | I-240/100 | TE2000/405.0 | C-2/3.2 | E2964/217.8/30% |
| 81 | I-240/100 | D-2103/410.7 | C-2/6.4 | E2964/276.7/35% |
| 82 | I-240/100 | D-2103/410.7 | C-2/3.2 | 50% Para 50% E2905/301.8/37% |
| 83 | I-240/100 | D-2070/103.3 | C-2/3.2 | E2964/111.2/35% |
| 84 | I 240/100 | W11-225/105.5 | C-2/3.2 | E2964/112.4/35% |
| 85 | I-240/100 | TE 1500/304.5 | C-2/3.2 | Para/135.9/25% |
| 86 | I-240/100 | TE 2000/405.0 | C-2/3.2 | E2964/273.6/35% |
| 87 | I-181/100 | D-2070/128.3 | C-2/4.0 | Para/99.6/30% |
| 88 | I-181/100 | D-2070/128.3 | C-2/4.0 | E2905/99.6/30% |
| 89 | I-181/100 | D-2070/128.3 | C-2/4.0 | E2964/99.6/30% |
| 90 | I-181/100 | D-800/36.9 | C-2/4.0 | Para/60.4/30% |
| 91 | I-181/100 | D-800/36.9 | C-2/4.0 | E2905/60.4/30% |
| 92 | I-181/100 | D-800/36.9 | C-2/4.0 | E2964/60.4/30% |
| 93 | I-181/100 | W11-112/261.6 | C-2/4.0 | Para/156.7/30% |
| 94 | I-181/100 | W11-112/261.6 | C-2/4.0 | E2964/156.7/30% |
| 95 | I-181/100 | W11-225/130.7 | C-2/4.0 | Para/100.6/30% |
| 96 | I-181/100 | W11-225/130.7 | C-2/4.0 | E2964/100.6/30% |
| 97 | I-181/100 | TE 1500/378.1 | C-2/4.0 | E2905/206.6/30% |
| 98 | I-181/100 | TE 1500/378.1 | C-2/4.0 | E2964/206.6/30% |
| 99 | I-181/100 | TE 2000/502.8 | C-2/4.0 | E2905/260.1/30% |
| 100 | I-181/100 | TE 2000/502.8 | C-2/4.0 | E2964/260.1/30% |
| 101 | I-181/100 | D-2103/509.9 | C-2/4.0 | Para/409.3/40% |
| 102 | I-181/100 | D-2103/509.9 | C-2/4.0 | E2964/502.3/45% |
| 103 | I-181/100 | D-2103/509.9 | C-2/4.0 | E2905/613.9/50% |
| 104 | I-181/100 | D-2103/509.9 | C-2/4.0 | E2964/613.9/50% |
| 105 | I-181/100 | D-2070/128.3 | C-2/4.0 | 85% E2964 15% Para/125.1/35% |
| 106 | I-181/100 | W11-225/130.7 | C-2/4.0 | Para/156.5/40% |
| 107 | I-181/100 | W11-225/130.7 | C-2/4.0 | E2905/156.5/40% |

TABLE IC-continued

FORMULATION

| Sample Code | Isocyanate/phr | polyol/phr | Catalyst/ml/hr | Oil/phr/% |
|---|---|---|---|---|
| 108 | I-181/100 | W11-225/130.7 | C-2/4.0 | 75% Para 25% E2964/126.5/35% |
| 109 | I-181/100 | W11-225/130.7 | C-2/4.0 | 85% Para 15% E2964/126.5/35% |
| 110 | E-410/100 | D-2103/199.9 | C-2/2.0 | E2964/129.4/30% |
| 111 | E-410/100 | D-2070/50.3 | C-2/1.0 | Para/65.3/30% |
| 112 | E-410/100 | D-2070/50.3 | C-2/1.0 | E2905/65.3/30% |
| 113 | E-410/100 | D-2070/50.3 | C-2/1.0 | E2964/65.3/30% |
| 114 | E-410/100 | D-800/14.5 | C-2/1.0 | Para/49.9/30% |
| 115 | E-410/100 | D-800/14.5 | C-2/1.0 | E2905/49.9/30% |
| 116 | E-410/100 | D-800/14.5 | C-2/1.0 | E2964/49.9/30% |
| 117 | E-410/100 | W11-112/102.6 | C-2/2.0 | Para/87.7/30% |
| 118 | E-410/100 | W11-112/102.6 | C-2/2.0 | E2964/87.7/30% |
| 119 | E-410/100 | W11-225/51.2 | C-2/2.0 | Para/65.7/30% |
| 120 | E-410/100 | W11-225/51.2 | C-2/2.0 | E2905/65.7/30% |
| 121 | E-410/100 | TE 1500/148.3 | C-2/2.0 | E2905/107.3/30% |
| 122 | E-410/100 | TE 1500/148.3 | C-2/2.0 | E2964/107.3/30% |
| 123 | E-410/100 | TE 2000/197.2 | C-2/2.0 | Para/128.2/30% |
| 124 | E-410/100 | TE 2000/197.2 | C-2/2.0 | E2905/128.2/30% |
| 125 | E-410/100 | TE 2000/197.2 | C-2/2.0 | E2964/128.2/30% |
| 126 | E-410/100 | D-2103/199.9 | C-2/4.0 | Para/162.5/35% |
| 127 | E-410/100 | D-2103/199.9 | C-2/4.0 | 75% Para 25% E2905/162.5/35% |
| 128 | E-410/100 | D-2070/50.3 | C-2/1.0 | Para/81.5/35% |
| 129 | E-410/100 | D-2070/50.3 | C-2/1.0 | E2905/81.5/35% |
| 130 | E-410/100 | D-2070/50.3 | C-2/1.0 | 75% Para/65.3/30%/25% E2905 |
| 131 | E-410/100 | W11-112/102.6 | C-2/2.0 | E2905/110.2/35% |
| 132 | E-410/100 | W11-225/51.6 | C-2/2.0 | E2905/82.5/35% |
| 133 | E-410/100 | W11-225/51.6 | C-2/2.0 | E2964/82.5/35% |
| 134 | E-410/100 | TE-1500/148.3 | C-2/2.0 | E2905/166.9/40% |
| 135 | E-410/100 | TE-1500/148.3 | C-2/2.0 | 75% Para/107.3/30%/25% E2905 |
| 136 | E-410/100 | TE-1500/148.3 | C-2/2.0 | 50% Para/107.3/30%/50% E2905 |
| 137 | L-2291A/100 | D-2103/511.0 | C-2/4.0 | Para/263.6/30% |
| 138 | L-2291A/100 | D-2103/511.0 | C-2/4.0 | E2905/263.6/30% |
| 139 | L-2291A/100 | D-2103/511.0 | C-2/4.0 | E2964/263.6/30% |
| 140 | L-2291A/100 | D-2070/128.5 | C-2/4.0 | Para/99.6/30% |
| 141 | L-2291A/100 | D-2070/128.5 | C-2/4.0 | E2905/99.6/30% |
| 142 | L-2291A/100 | D-800/36.9 | C-2/4.0 | Para/60.4/30% |
| 143 | L-2291A/100 | D-800/36.9 | C-2/4.0 | E2905/60.4/30% |
| 144 | L-2291A/100 | D-800/36.9 | C-2/4.0 | D2964/60.4/30% |
| 145 | L-2291A/100 | W11-112/262.1 | C-2/4.0 | Para/156.9/30% |
| 146 | L-2291A/100 | W11-112/262.1 | C-2/4.0 | E2905/156.9/30% |
| 147 | L-2291A/100 | W11-112/262.1 | C-2/4.0 | E2964/156.9/30% |
| 148 | L-2291A/100 | W11-225/131.1 | C-2/4.0 | Para/100.8/30% |
| 149 | L-2291A/100 | W11-225/131.1 | C-2/4.0 | E2905/100.8/30% |
| 150 | L-2291A/100 | W11-225/131.1 | C-2/4.0 | E2964/100.8/30% |
| 151 | L-2291A/100 | TE-1500/378.9 | C-2/4.0 | Para/207.0/30% |
| 152 | L-2291A/100 | TE-1500/378.9 | C-2/4.0 | E2905/207.0/30% |
| 153 | L-2291A/100 | TE-1500/378.9 | C-2/4.0 | E2964/207.0/30% |
| 154 | L-2291A/100 | TE-2000/503.9 | C-2/4.0 | Para/260.5/30% |
| 155 | L-2291A/100 | TE-2000/503.9 | C-2/4.0 | E2905/260.5/30% |
| 156 | L-2291A/100 | TE-2000/503.9 | C-2/8.0 | E2964/260.5/30% |
| 157 | L-2291A/100 | D-2070/128.5 | C-2/4.0 | Para/155.0/40% |
| 158 | L-2291A/100 | D-2070/128.5 | C-2/4.0 | E2905/155.0/40% |
| 159 | L-2291A/100 | D-2070/128.5 | C-2/4.0 | E2964/155.0/40% |
| 160 | L-2291A/100 | D-2070/128.5 | C-2/4.0 | Para/126.2/35% |
| 161 | L-2291A/100 | D-800/36.9 | C-2/4.0 | E2905/75.9/35% |
| 162 | L-2291A/100 | W11-225/131.1 | C-2/4.0 | E2905/126.5/35% |
| 163 | L-2291A/100 | TE-1500/378.9 | C-2/4.0 | Para/260.0/35% |
| 164 | L-2291A/100 | TE-2000/503.9 | C-2/4.0 | Para/327.3/35% |
| 165 | I-240/100 | D-2103/410.7 | DC-1/6.4 | Para/221.6/30% |
| 166 | I-240/100 | D-2103/410.7 | DC-1/6.4 | E2905/221.6/30% |
| 167 | I-240/100 | D-2103/410.7 | DC-1/12.8 | E2964/221.6/30% |
| 168 | I-240/100 | D-2070/103.3 | DC-1/6.4 | E2905/89.4/30% |
| 169 | I-240/100 | D-2070/103.3 | DC-1/6.4 | E2964/89.4/30% |
| 170 | I-240/100 | D-800/29.7 | DC-1/6.4 | Para/73.3/35% |
| 171 | I-240/100 | W11-112/211.2 | DC-1/6.4 | Para/136.1/30% |
| 172 | I-240/100 | W11-112/211.2 | DC-1/6.4 | E2905/136.1/30% |
| 173 | I-240/100 | W11-112/211.2 | DC-1/6.4 | E2964/136.1/30% |
| 174 | I-240/100 | W11-225/105.5 | DC-1/6.4 | Para/90.8/30% |
| 175 | I-240/100 | W11-225/105.5 | DC-1/6.4 | E2905/90.8/30% |
| 176 | I-240/100 | W11-225/105.5 | DC-1/6.4 | E2964/90.8/30% |
| 177 | I-240/100 | TE-1500/304.5 | DC-1/6.4 | Para/176.1/30% |
| 178 | I-240/100 | TE-1500/304.5 | DC-1/6.4 | E2905/176.1/30% |
| 179 | I-240/100 | TE-1500/304.5 | DC-1/6.4 | E2964/176.1/30% |
| 180 | I-240/100 | TE-2000/405.0 | DC-1/6.4 | Para/219.2/30% |
| 181 | I-240/100 | TE-2000/405.0 | DC-1/6.4 | E2905/219.2/30% |
| 182 | I-240/100 | TE-2000/405.0 | DC-1/6.4 | E2964/219.2/30% |
| 183 | I-240/100 | D-2103/410.7 | DC-1/6.4 | Para./278.4/35% |
| 184 | I-240/100 | D-2103/410.7 | DC-1/6 4 | E2905/278.4/35% |
| 185 | I-240/100 | D-2103/410.7 | DC-1/6.4 | E2905/112.9/35% |
| 186 | I-240/100 | D-2103/410.7 | SA-102/6.4 | Para/220.6/30% |
| 187 | I-240/100 | D-2013/410.7 | SA-102/20.0 | Para/227.4/30% |
| 188 | I-240/100 | D-2103/410.7 | SA-102/20.0 | E2905/227.4/30% |
| 189 | I-240/100 | D-2103/410.7 | SA-102/20.0 | E2964/227.4/30% |
| 190 | I-240/100 | D-2070/103.3 | SA-102/3.2 | Para/88.5/30% |
| 191 | I-240/100 | D-2070/103.3 | SA-102/6.4 | Para/89.9/30% |
| 192 | I-240/100 | D-2070/103.3 | SA-102/6.4 | E2905/89.9/30% |
| 193 | I-240/100 | D-2070/103.3 | SA-102/6.4 | E2964/89.9/30% |

TABLE IC-continued

FORMULATION

| Sample Code | Isocyanate/phr | polyol/phr | Catalyst/ml/hr | Oil/phr/% |
|---|---|---|---|---|
| 194 | I-240/100 | W11-112/211.2 | SA-102/3.2 | Para/134.7/30% |
| 195 | I-240/100 | W11-112/211.2 | SA-102/3.2 | E2905/134.7/30% |
| 196 | I-240/100 | W11-112/211.2 | SA-102/3.2 | E2964/134.7/30% |
| 197 | I-240/100 | W11-225/105.5 | SA-102/3.2 | Para/89.4/30% |
| 198 | I-240/100 | W11-225/105.5 | SA-102/3.2 | Para/89.4/30% |
| 199 | I-240/100 | W11-225/105.5 | SA-102/3.2 | E2964/89.4/30% |
| 200 | I-240/100 | TE-1500/304.5 | SA-102/6.4 | Para/175.1/30% |
| 201 | I-240/100 | TE-1500/304.5 | SA-102/20.0 | E2905/181.9/30% |
| 202 | I-240/100 | TE-1500/304.5 | SA-102/20.0 | E2964/181.9/30% |
| 203 | I-240/100 | TE-2000/405.0 | SA-102/20.0 | Para/225/30% |
| 204 | I-240/100 | TE-2000/405.0 | SA-102/20.0 | E2905/225.0/30% |
| 205 | I-240/100 | TE-2000/405.0 | SA-102/20.0 | E2964/225.0/30% |
| 206 | I-240/100 | D-2103/410.7 | SA-102/6.4 | Para/278.4/35% |
| 207 | I-240/100 | W11-225/105.5 | SA-102/3.2 | Para/112.5/35% |
| 208 | I-240/100 | W11-225/105.5 | SA-102/3.2 | E2964/112.4/35% |
| 209 | L-229/100 | D-2103/511.0 | SA-102/12.0 | Para/267.0/30% |
| 210 | L-229/100 | D-2103/511.0 | SA-102/12.0 | E2905/267.0/30% |
| 211 | L-229/100 | D-2103/511.0 | SA-102/12.0 | E2964/267.0/30% |
| 212 | L-229/100 | D-2070/128.5 | SA-102/8.0 | Para/99.6/30% |
| 213 | L-229/100 | D-2070/128.5 | SA-102/8.0 | E2905/99.6/30% |
| 214 | L-229/100 | D-2070/128.5 | SA-102/8.0 | E2964/99.6/30% |
| 215 | L-229/100 | W11-112/262.1 | SA-102/8.0 | Para/158.6/30% |
| 216 | L-229/100 | W11-112/262.1 | SA-102/8.0 | E2905/158.6/30% |
| 217 | L-229/100 | W11-112/262.1 | SA-102/8.0 | E2964/158.6/30% |
| 218 | L-229/100 | W11-225/131.1 | SA-102/8.0 | Para/102.4/30% |
| 219 | L-229/100 | W11-225/131.1 | SA-102/8.0 | E2905/102.4/30% |
| 220 | L-229/100 | W11-225/131.1 | SA-102/8.0 | E2964/102.4/30% |
| 221 | L-229/100 | TE-1500/378.9 | SA-102/8.0 | Para/207.0/30% |
| 222 | L-229/100 | TE-1500/378.9 | SA-102/8.0 | E2905/207.0/30% |
| 223 | L-229/100 | TE-1500/378.9 | SA-102/8.0 | E2964/207.0/30% |
| 224 | L-229/100 | TE-2000/503.9 | SA-102/8.0 | Para/260.5/30% |
| 225 | L-229/100 | TE-2000/503.9 | SA-102/8.0 | E2905/260.5/30% |
| 226 | L-229/100 | TE-2000/503.9 | SA-102/8.0 | E2964/260.5/30% |
| 227 | E-410/100 | D-2103/199.9 | SA-102/2.0 | Para/129.4/30% |
| 228 | E-410/100 | D-2103/199.9 | SA-102/2.0 | E2905/129.4/30% |
| 229 | E-410/100 | D-2103/199.9 | SA-102/2.0 | E2964/129.4/30% |
| 230 | E-410/100 | D-2070/50.3 | SA-102/2.0 | Para/65.3/30% |
| 231 | E-410/100 | D-2070/50.3 | SA-102/2.0 | E2905/65.3/30% |
| 232 | E-410/100 | D-2070/50.3 | SA-102/2.0 | E2964/65.3/30% |
| 233 | E-410/100 | W11-112/102.6 | SA-102/2.0 | Para/87.7/30% |
| 234 | E-410/100 | W11-112/102.6 | SA-102/2.0 | E2905/87.7/30% |
| 235 | E-410/100 | W11-112/102.6 | SA-102/2.0 | E2964/87.7/30% |
| 236 | E-410/100 | W11-225/51.2 | SA-102/2.0 | Para/65.7/30% |
| 237 | E-410/100 | W11-225/51.2 | SA-102/2.0 | E2905/65.7/30% |
| 238 | E-410/100 | W11-225/51.2 | SA-102/2.0 | E2964/65.7/30% |
| 239 | E-410/100 | TE-1500/148.3 | SA-102/2.0 | Para/107.3/30% |
| 240 | E-410/100 | TE-1500/148.3 | SA-102/2.0 | E2905/107.3/30% |
| 241 | E-410/100 | TE-1500/148.3 | SA-102/2.0 | E2964/107.3/30% |
| 242 | E-410/100 | TE-2000/128.2 | SA-102/2.0 | Para/128.2/30% |
| 243 | E-410/100 | TE-2000/128.2 | SA-102/2.0 | E2905/128.2/30% |
| 244 | E-410/100 | TE-2000/128.2 | SA-102/2.0 | E2964/128.2/30% |
| 245 | E-410/100 | D-2103/199.9 | SA-102/2.0 | Para/163.1/35% |
| 246 | I-181/100 | D-2103/509.9 | SA-102/8.0 | Para/264.8/30% |
| 247 | I-181/100 | D-2103/509.9 | SA-102/8.0 | E2905/264.8/30% |
| 248 | I-181/100 | D-2103/509.9 | SA-102/8.0 | E2964/264.8/30% |
| 249 | I-181/100 | D-2070/128.3 | SA-102/8.0 | Para/101.3/30% |
| 250 | I-181/100 | D-2070/128.3 | SA-102/8.0 | E2905/101.3/30% |
| 251 | I-181/100 | D-2070/128.3 | SA-102/8.0 | E2964/101.3/30% |
| 252 | I-181/100 | W11-112/261.6 | SA-102/4.0 | Para/156.7/30% |
| 253 | I-181/100 | W11-112/261.6 | SA-102/4.0 | E2905/156.7/30% |
| 254 | I-181/100 | W11-225/130.7 | SA-102/4.0 | Para/100.6/30% |
| 255 | I-181/100 | W11-225/130.7 | SA-102/4.0 | E2905/101.6/30% |
| 256 | I-181/100 | TE-1500/378.1 | SA-102/4.0 | Para/206.6/30% |
| 257 | I-181/100 | TE-1500/378.1 | SA-102/4.0 | E2905/206.6/30% |
| 258 | I-181/100 | TE-1500/378.1 | SA-102/4.0 | E2964/206.6/30% |
| 259 | I-181/100 | TE-2000/502.8 | SA-102/4.0 | E2905/260.1/30% |
| 260 | I-181/100 | TE-2000/502.8 | SA-102/4.0 | D2964/260.1/30% |
| 261 | I-181/100 | D-2103/509.9 | SA-102/8.0 | Para/332.7/35% |
| 262 | I-181/100 | TE-1500/378.1 | SA-102/4.0 | Para/259.6/35% |
| 263 | I-181/100 | TE-1500/378.1 | SA-102/20.0 | Para/213.5/30% |
| 264 | I-181/100 | TE-1500/378.1 | SA-102/20.0 | E2905/213.5/30% |
| 265 | I-181/100 | TE-2000/502.8 | SA-102/4.0 | Para/326.7/35% |
| 266 | I-181/100 | TE-2000/502.8 | SA-102/20.0 | Para/266.9/30% |
| 267 | I-240/100 | D-2103/410.7 | C-2/3.2 | PAO/218.9/30% |
| 268 | I-240/100 | D-2103/410.7 | C-2/3.2 | Amsoil/218.9/30% |
| 269 | I-240/100 | D-2103/410.7 | C-2/3.2 | Silicon/218.9/30% |
| 270 | I-240/100 | D-2103/410.7 | C-2/3.2 | E2935/218.9/30% |
| 271 | I-240/100 | D-2103/410.7 | C-2/3.2 | E2958/218.9/30% |
| 272 | I-240/100 | D-2103/410.7 | C-2/3.2 | E3006/218.9/30% |
| 273 | I-240/100 | D-2103/410.7 | C-2/3.2 | E2427/218.9/30% |
| 274 | I-240/100 | D-2103/410.7 | C-2/3.2 | E2873/218.9/30% |

TABLE IC-continued

FORMULATION

| Sample Code | Isocyanate/phr | polyol/phr | Catalyst/ml/hr | Oil/phr/% |
|---|---|---|---|---|
| 275 | I-240/100 | D-2070/103.3 | C-2/3.2 | Amsoil/88.5/30% |
| 276 | I-240/100 | D-2070/103.3 | C-2/3.2 | Silicon/88.5/30% |
| 277 | I-240/100 | D-2070/103.3 | C-2/3.2 | E2935/88.5/30% |
| 278 | I-240/100 | D-2070/103.3 | C-2/3.2 | E2958/88.5/30% |
| 279 | I-240/100 | D-2070/103.3 | C-2/3.2 | E3006/88.5/30% |
| 280 | I-240/100 | D-2070/103.3 | C-2/3.2 | E2427/88.5/30% |
| 281 | I-240/100 | W11-112/211.2 | C-2/3.2 | Amsoil/134.8/30% |
| 282 | I-240/100 | W11-112/211.2 | C-2/3.2 | Silicon/134.8/30% |
| 283 | I-240/100 | W11-112/211.2 | C-2/3.2 | E2935/134.8/30% |
| 284 | I-240/100 | W11-112/211.2 | C-2/3.2 | E2958/134.8/30% |
| 285 | I-240/100 | W11-112/211.2 | C-2/3.2 | E3006/134.8/30% |
| 286 | I-240/100 | W11-112/211.2 | C-2/3.2 | E2427/134.8/30% |
| 287 | I-240/100 | W11-225/105.5 | C-2/3.2 | Amsoil/89.4/30% |
| 288 | I-240/100 | W11-225/105.5 | C-2/3.2 | E2935/89.4/30% |
| 289 | I-240/100 | W11-225/105.5 | C-2/3.2 | E2958/89.4/30% |
| 290 | I-240/100 | W11-225/105.5 | C-2/3.2 | E3006/89.4/30% |
| 291 | I-240/100 | W11-225/105.5 | C-2/3.2 | E2427/89.4/30% |
| 292 | I-240/100 | TE-1500/304.5 | C-2/3.2 | E2427/174.7/30% |
| 293 | I-240/100 | TE-2000/405.0 | C-2/3.2 | E2427/217.8/30% |
| 294 | I-240/100 | D-2070/103.3 | C-2/3.2 | 25% Silicon/88.5/35%/75% Para |
| 295 | I-240/100 | D-2070/103.3 | C-2/3.2 | 40% Silicon/111.2/35%/60% Para |
| 296 | I-240/100 | W11-112/211.2 | C-2/3.2 | 50% E2873/113.4/30%/50% Para |
| 297 | I-240/100 | W11-112/211.2 | C-2/3.2 | 25% E2873./134.8/30%/75% Para |
| 298 | I-181/100 | D-2103/509.9 | C-2/4.0 | E2427/263.1/30% |
| 299 | I-181/100 | D-2070/128.3 | C-2/4.0 | E2427/99.6/30% |
| 300 | I-181/100 | D-800/36.9 | C-2/4.0 | E2427/60.4/30% |
| 301 | I-181/100 | W11-112/261.6 | C-2/4.0 | E2427/156.7/30% |
| 302 | I-181/100 | W11-225/130.7 | C-2/4.0 | E2427/100.6/30% |
| 303 | I-181/100 | TE-1500/378.1 | C-2/4.0 | E2427/206.6/30% |
| 304 | I-181/100 | TE-2000/502.8 | C-2/4.0 | E2427/260.1/30% |
| 305 | I-240/100 | W11-225/105.5 | 33LV/6.4 | Para/90.9/30% |
| 306 | I-240/100 | W11-225/105.5 | 33LV/6.4 | Para/114.1/35% |
| 307 | I-240/100 | D-2070/128.3 | 33LV/4.0 | Para/99.6/30% |
| 308 | I-181/100 | W11-225/130.7 | 33LV/4.0 | Para/100.6/30% |
| 309 | E-410/100 | D-2070 50.3 | 33LV/2.0 | Para/65.3/30% |
| 310 | E-410/100 | W11-225/51.0 | 33LV/2.0 | Para/65.7/30% |
| 311 | L-2291A/100 | D-2070/128.5 | 33LV/4.0 | Para/99.6/30% |
| 312 | L-2291A/100 | D-2070/131.1 | 33LV/4.0 | Para/100.8/30% |
| 313 | I-181/100 | E2427/149.3 | C-2/4.0 | Para/108.6/30% |
| 314 | I-181/100 | E2873/287.3 | C-2/4.0 | Para/175.9/31% |
| 315 | E-410/100 | E2427/58.5 | C-2/2.0 | Para/68.8/30% |
| 316 | E-410/100 | E2427/58.5 | C-2/2.0 | E2905/68.8/30% |
| 317 | E-410/100 | E2427/58.5 | C-2/2.0 | E2964/68.8/30% |
| 318 | E-410/100 | E2873/120.2 | C-2/2.0 | Para/95.2/30% |
| 319 | E-410/100 | E2873/120.2 | C-2/2.0 | E2905/95.2/30% |
| 320 | E-410/100 | E2873/120.2 | C-2/2.0 | E2964/95.2/30% |
| 321 | L-2291A/100 | E2427/149.6 | C-2/4.0 | Para/108.7/30% |
| 322 | L-2291A/100 | E2427/149.6 | C-2/4.0 | E2905/108.7/30% |
| 323 | L-2291A/100 | E2427/149.6 | C-2/4.0 | E2964/108.6/30% |
| 324 | L-2291A/100 | E2873/307.1 | C-2/4.0 | E2905/176.2/30% |
| 325 | L-2291A/100 | E2873/307.1 | C-2/4.0 | E2964/176.2/30% |
| 326 | L-2291A/100 | E2873/307.1 | C-2/4.0 | Para/274.1/40% |
| 327 | L-2291A/100 | E2873/307.1 | C-2/4.0 | Para/336.2/45% |
| 328 | I-181/100 | D2103/509.9 | C-2/4.0 | E2964/409.3/40% |
| 329 | I-181/100 | W11-225/130.7 | C-2/4.0 | 25% Para/156.3/40%/75%/E2964 |
| 330 | I-181/100 | D-2103/509.9 | C-2/8.0 | E2964/409.3/39% |
| 331 | I-240/100 | 25% D-800/238.6 25% 3-2070/238.6 50% D-2103/ | C-2/3.2 | Para/225.7/40% |
| 332 | I-181/100 | D-2070/117.7 | C-2/3.7 | E2964/114.8/34% |
| 333 | I-181/100 | D-2070/128.3 | C-2/4.0 | E2964/99.6/30% |
| 334 | E-410/100 | D-2070/50.3 | C-2/2.0 | E2964/65.3/30% |
| 335 | E-410/100 | ppd/7.7 | C-2/0.1 | Para/101 |
| 336 | E-410/100 | ppd/7.7 | C-2/0.2 | Para/60 |
| 337 | E-410/100 | DPG/13.5 | C-2/0.1 | Para/38 |
| 338 | E-410/25 | DPG/5 & 4301/50 | C-2/0.3 | Para/75 |
| 339 | F-242/25 | 4301/38 | C-2/0.2 | Para/46 |
| 340 | F-242/25 | 4301/20 | C-2/0.2 | Para/40 |
| 341 | I-240/100 | ppd/15.9 | C-2/0.2 | Para/100 |
| 342 | I-240/100 | DPG/27 | C-2/0.1 | Para/60 |
| 343 | I-240/10 | 4301/40 | C-2/0.1 | Para/50 |
| 344 | 1-240/100 | DPG/20 | C-2/0.05 | Para/60 |
| 345 | I-240/50 | DPG 10 & 4301/30 | C-2/0.2 | Para/85 |
| 346 | I-181/50 | ppd/10 | C-2/0.2 | Para/50 |
| 347 | I-181/50 | ppd/9 | C-2/0.1 | Para/50 |
| 348 | I-181/100 | 4301/50 | C-2/0.15 | Para/50 |
| 349 | I-181/100 | DPG/35 | C-2/0.1 | Para/70 |
| 350 | I-181/100 | DPG/25 | C-2/0.05 | Para/71 |
| 351 | I-181/100 | DPG/15 | C-2/0.02 | Para/70 |
| 352 | I-181/50 | DPG 17 & 4301/17 | C-2/0.15 | Para/85 |
| 353 | I-181/10 | DPG 2 & 4301/10 | C-2/0.05 | Para/26 |
| 354 | I-181/50 | DPG 12 & 4301/25 | C-2/0.2 | Para/85 |
| 355 | I-181/50 | DPG 10 & 4301/30 | C-2/0.35 | Para/90 |
| 356 | LW520/100 | Caytur 21/24 | Glycerol/0.5 | Para/70 |

TABLE ID

EVALUATION

| Sample Code | Compressive Modulus | Tear Strength | Oil Availability |
|---|---|---|---|
| 63 | Semi-spongy | Good | Contained |
| 64 | Semi-spongy | Good | Contained |
| 65 | Semi-spongy | Good | Contained |
| 66 | Spongy | Low | Available |
| 67 | Spongy | Low | Available |
| 68 | Rigid | Good | Available |
| 69 | Spongy | Good | Available |
| 70 | Spongy | Low | Available |
| 71 | — | — | Separation |
| 72 | Spongy | Good | Available |
| 73 | Spongy | Low | Available |
| 74 | Spongy | Low | Available |
| 75 | — | — | Separation |
| 76 | Spongy | Low | Contained |
| 77 | — | — | Separation |
| 78 | Spongy | Good | Contained |
| 79 | Spongy | Low | Contained |
| 80 | Spongy | Low | Contained |
| 81 | Spongy | Good | Contained |
| 82 | Spongy | Good | Contained |
| 83 | — | — | Separation |
| 84 | — | — | Separation |
| 85 | Spongy | Good | Contained |
| 86 | — | No Structure | — |
| 87 | Spongy | Low | Available |
| 88 | Rigid | Good | Contained (Slight Separation) |
| 89 | Rigid | Low | Contained |

TABLE ID-continued

| | EVALUATION | | |
|---|---|---|---|
| 90 | Rigid | Good | Available |
| 91 | Rigid | Good | Contained |
| 92 | Rigid | Good | Contained |
| 93 | — | — | Separation |
| 94 | — | — | Separation |
| 95 | Semi-spongy | Good | Available |
| 96 | Semi-rigid | Good | Available (Slight Separation) |
| 97 | Spongy | Low | Contained |
| 98 | — | — | Separation |
| 99 | Spongy | Good | Contained |
| 100 | Spongy | Low | Contained |
| 101 | — | No Structure | — |
| 102 | Spongy | Fair | Available |
| 103 | — | No Structure | — |
| 104 | — | — | Separation |
| 105 | Rigid | Low | Contained |
| 106 | Semi-spongy | Good | Available |
| 107 | Spongy | Low | Available |
| 108 | Semi-spongy | Good | Available |
| 109 | Semi-spongy | Low | Available |
| 110 | — | — | Separation |
| 111 | Spongy | Low | Available |
| 112 | Spongy | Good | Available |
| 113 | — | — | Separation |
| 114 | Rigid | Good | Available (Slight Separation) |
| 115 | Rigid | Good | Available |
| 116 | — | — | Separation |
| 117 | — | — | Separation |
| 118 | — | — | Separation |
| 119 | — | — | Separation |
| 120 | Spongy | Fair | Available (Slight Separation) |
| 121 | Spongy | Fair | Contained |
| 122 | Spongy | Good | Contained |
| 123 | — | — | Separation |
| 124 | Spongy | Low | Contained |
| 125 | Spongy | Low | Contained |
| 126 | — | — | Separation |
| 127 | — | — | Separation |
| 128 | Spongy | Low | Available |
| 129 | — | — | Separation |
| 130 | — | No Structure | — |
| 131 | — | — | Separation |
| 132 | — | — | Separation |
| 133 | — | — | Separation |
| 134 | — | — | Separation |
| 135 | — | — | Separation |
| 136 | — | — | Separation |
| 137 | Semi-rigid | Fair | Contained |
| 138 | Semi-rigid | Fair | Contained |
| 139 | — | No Cure | — |
| 140 | Rigid | Good | Contained |
| 141 | Rigid | Good | Contained |
| 142 | — | No Structure | — |
| 143 | Rigid | Good | Contained |
| 144 | — | No Structure | — |
| 145 | — | No Cure | — |
| 146 | — | No Cure | — |
| 147 | — | No Cure | — |
| 148 | — | No Structure | — |
| 149 | Semi-rigid | Fair | Contained |
| 150 | — | No Cure | — |
| 151 | Semi-rigid | Fair | Contained |
| 152 | Semi-rigid | Fair | Contained |
| 153 | Spongy | Fair | Contained |
| 154 | Semi-rigid | Fair | Contained |
| 155 | Semi-rigid | Fair | Contained |
| 156 | Semi-rigid | Fair | Contained |
| 157 | — | No Structure | — |
| 158 | — | No Structure | — |
| 159 | — | No Structure | — |
| 160 | Spongy | Very Low | Available |
| 161 | — | No Structure | — |
| 162 | — | No Structure | — |
| 163 | — | No Structure | — |
| 164 | — | No Structure | — |
| 165 | Spongy-tacky | Good | Contained |
| 166 | Spongy-tacky | Good | Contained |
| 167 | Deforms | — | — |
| 168 | Semi-rigid | Good | Contained |
| 169 | — | — | Separation |
| 170 | Rigid | Good | Available |
| 171 | Deforms | — | Separation |
| 172 | — | — | Separation |
| 173 | Very Spongy | Fair | Available |
| 174 | Very Spongy | Good | Available (Slight Separation) |
| 175 | — | — | Separation |
| 176 | Very Spongy | Fair | Available |
| 177 | Deforms | — | — |
| 178 | Deforms | — | — |
| 179 | Deforms | — | — |
| 180 | Deforms | — | — |
| 181 | Deforms | — | — |
| 182 | Deforms | — | — |
| 183 | Spongy | Good | Contained |
| 184 | Spongy-tacky | Good | Contained |
| 185 | Spongy | Good | Available |
| 186 | Spongy | Good | Contained |
| 187 | Spongy | Good | Contained |
| 188 | Spongy | Good | Contained |
| 189 | Deforms | — | — |
| 190 | — | — | Separation |
| 191 | — | No Structure | — |
| 192 | Expands | — | — |
| 193 | Expands | — | — |
| 194 | Spongy | Fair | Available |
| 195 | Spongy | Low | Contained |
| 196 | — | — | Separation |
| 197 | Spongy | Fair | Available |
| 198 | Spongy | Good | Available |
| 199 | Spongy | Good | Available |
| 200 | Spongy | Good | Contained |
| 201 | Deforms | — | — |
| 202 | Deforms | — | — |
| 203 | — | — | Separation |
| 204 | — | — | Separation |
| 205 | Deforms | — | — |
| 206 | Spongy | Good | Contained |
| 207 | Spongy | Fair | Available |
| 208 | Spongy | Fair | Available |
| 209 | Semi spongy | Good | Contained |
| 210 | Spongy | Fair | Contained |
| 211 | — | — | Separation |
| 212 | Semi-rigid | Good | Contained |
| 213 | — | — | Separation |
| 214 | — | — | Separation |
| 215 | — | — | Separation |
| 216 | — | No Structure | — |
| 217 | — | — | Separation |
| 218 | — | No Structure | — |
| 219 | Seni-rigid | Fair | Available |
| 220 | — | No Structure | — |
| 221 | Semi-rigid | Low | Contained |
| 222 | Semi-rigid | Low | Contained |
| 223 | — | — | Separation |
| 224 | Semi-rigid | Low | Contained |
| 225 | Semi-rigid | Low | Contained |
| 226 | — | — | Separation |
| 227 | Spongy | Good | Contained |
| 228 | Very spongy | Fair | Available |
| 229 | — | — | Separation |
| 230 | — | — | Separation |
| 231 | — | — | Separation |
| 232 | — | — | Separation |
| 233 | Spongy-tacky | Low | Available (Slight Separation) |
| 234 | Spongy | Low | Available |
| 235 | Spongy | Fair | Available |
| 236 | Spongy-tacky | Low | Available (Slight Separation) |
| 237 | Spongy | Low | Available |
| 238 | — | Fair | Available |
| 239 | Deforms | — | Separation |
| 240 | Deforms | — | — |
| 241 | — | — | Separation |
| 242 | — | — | Separation |
| 243 | Deforms | — | — |
| 244 | Deforms | — | — |
| 245 | — | — | Separation |

TABLE ID-continued
EVALUATION

| | | | |
|---|---|---|---|
| 246 | Semi-spongy | Good | Contained |
| 247 | Semi-spongy | Good | Contained |
| 248 | Expands-tacky | — | — |
| 249 | Expands | — | — |
| 250 | Expands | — | — |
| 251 | Expands | — | — |
| 252 | Spongy | Fair | Available |
| 253 | Spongy | Fair | Available |
| 254 | Semi-rigid | Fair | Available |
| 255 | Semi-rigid | Good | Available |
| 256 | Semi-spongy | Good | Contained |
| 257 | Deforms | — | — |
| 258 | Deforms | — | — |
| 259 | Deforms | — | — |
| 260 | — | No Structure | — |
| 261 | — | No Structure | — |
| 262 | — | No Structure | — |
| 263 | Expands | — | — |
| 264 | Deforms | — | — |
| 265 | Spongy | Low | Available |
| 266 | Spongy | Fair | Available |
| 267 | — | — | Separation |
| 268 | — | No gel | — |
| 269 | Semi-spongy | Good | Contained |
| 270 | Spongy-tacky | Good | Contained |
| 271 | Spongy-tacky | Good | Contained |
| 272 | — | — | Separation |
| 273 | — | No gel | — |
| 274 | — | No Structure | — |
| 275 | — | No gel | — |
| 276 | Semi-rigid | Good | Contained |
| 277 | Semi-rigid | Good | Contained |
| 278 | Semi-rigid | Good | Contained |
| 279 | — | — | Separation |
| 280 | Very spongy | Low | Contained |
| 281 | — | No gel | — |
| 282 | Semi-spongy | Good | Contained |
| 283 | — | — | Separation |
| 284 | — | — | Separation |
| 285 | — | — | Separation |
| 286 | — | No Structure | — |
| 287 | — | No gel | — |
| 288 | — | — | Separation |
| 289 | — | — | Separation |
| 290 | — | — | Separation |
| 291 | — | No Structure | — |
| 292 | — | No gel | — |
| 293 | — | No gel | — |
| 294 | Very spongy | Low | Available |
| 295 | — | No Structure | — |
| 296 | Spongy | Low | Contained |
| 297 | Semi-spongy | Good | Contained |
| 298 | — | No Cure | — |
| 299 | Spongy | Good | Contained |
| 300 | Rigid | Good | Contained |
| 301 | — | No Cure | — |
| 302 | Spongy-tacky | Low | Contained |
| 303 | — | No Cure | — |
| 304 | — | No Cure | — |
| 305 | Semi-spongy | Good | Available |
| 306 | Spongy | Good | Available |
| 307 | Rigid | Good | Available |
| 308 | Rigid | Good | Available |
| 309 | — | — | Separation |
| 310 | — | — | Separation |
| 311 | — | No Cure | — |
| 312 | — | — | Separation |
| 313 | Rigid | Good | Contained |
| 314 | Semi-rigid | Good | Contained |
| 315 | Semi-spongy | Low | Contained |
| 316 | Spongy | Low | Contained |
| 317 | Spongy | Low | Contained |
| 318 | Spongy | Good | Contained |
| 319 | Spongy | Good | Contained |
| 320 | — | No Cure | — |
| 321 | Expands | — | — |
| 322 | Expands | — | — |
| 323 | Semi-rigid | Good | Contained |
| 324 | Semi-spongy | Fair | Contained |
| 325 | Semi-spongy | Fair | Contained |
| 326 | Semi-spongy | Fair | Contained |
| 327 | — | No Structure | — |
| 328 | Spongy | Good | Contained |
| 329 | Semi-spongy | Fair | Available |
| 330 | — | Phase Separation | — |
| 331 | — | No Cure | Separation |
| 332 | Rigid | Good | Contained |
| 333 | — | No Structure | — |
| 334 | Spongy | Good | Available |

| Sample Code | Observations |
|---|---|
| 335 | Oil Separated |
| 336 | Oil Separated |
| 337 | Oil Separated |
| 338 | Oil Separated |
| 339 | Oil Separated |
| 340 | Slight Separation |
| 341 | Very Hard |
| 342 | Very Hard |
| 343 | Slush |
| 344 | Oil Separated |
| 345 | Oil Separated |
| 346 | Slight Separation |
| 347 | Slight Separation |
| 348 | Slush |
| 349 | Very Hard |
| 350 | Very Hard |
| 351 | Very Hard |
| 352 | Oil Separation |
| 353 | Oil Separation |
| 354 | Oil Separation |
| 355 | Slight Separation |
| 356 | Oil Separation |

With respect to the compositions set forth in Tables IA, IB, IC ad ID, the compositions were formed with the lubricating oil and catalyst being initially mixed with the polyol and, when ready to make a microporous lubricating composition, this initial mixture was combined with the isocyanate with mixing continuing until the resulting final mixture was uniform throughout. The final mixture was then ready to be poured into a bearing or a mold while in liquid state and, where so poured, allowed to cure at room temperature (or alternately in an oven at not over about 200° F.). Such bearings or molds were normally first treated with a mold release suitable for polyurethanes to prevent adhesion of the formal microporous polymer lubricating composition to the bearing or mold. Surface energy modifiers, where utilized, as well as the various additives, such as chain extenders (e.g. hydroquinone), bleed control agents (e.g. fumed silica) and/or lubricating performance additives (e.g. Van Lub 73), where utilized, were added to the polyollubricating oil blend before combining with the isocyanate.

Particular ones of the compositions set forth hereinabove in Tables IA and IB were selected and samples made for oil extraction testing. Selection was based upon visual evaluation according to compressive modulus, tear strength, and oil availability.

For measuring available oil, a cork borer was used to cut cylindrical samples 19.5 mm in diameter from selector compositions. Samples that were 6.5 mm thick were cut from the centers of the rods. Each sample was placed in a wire mesh basket and weighed by difference. The baskets were then immersed in 350 ml of hexane for four hours. The extraction then continued in fresh hexane for an additional sixteen hours. During the test, the hexane was agitated by means of a magnetic stirring bar. The samples were then dried for twenty-four hours at room temperature before the final weighing.

For measuring available oil for samples used in bearing tests, samples that were 1.5 mm thick were cut from the same rods mentioned above for measuring extraction. Each sample was placed in a labeled paper envelope and immersed in hexane. Two washings were performed over a period of two days. The samples were then removed and dried at room temperature. The results of these tests (including an indication of those considered as best for bearing applications based, with a few exceptions, upon whether at least 15% of their total weight could be extracted with room temperature hexane and sufficient mechanical properties) are shown in Table II as follows:

TABLE II

| Sample Code | Amount of Oil In Sample (%) | Amount of Oil Extracted (%) | Visual Description of Pore Size and Distribution | Bearing Candidates (BC) |
| --- | --- | --- | --- | --- |
| 1 | 30 | 25.7 | Very large pores, non-uniform | |
| 2 | 35 | 14.5 | Few pores, smooth | |
| 3 | 35 | 5.3 | No pores, smooth | |
| 4 | 37 | 35.8 | medium sized pores, uniform (crumbly) | |
| 5 | 37 | 15.8 | Few pores, smooth | |
| 6 | 35 | 28.2 | Very fine pores, uniform | BC |
| 7 | 35 | 32.6 | Medium sized pores, uniform | BC |
| 8 | 30 | 7.8 | No pores, smooth | |
| 9 | 30 | 0 | No pores, smooth | |
| 10 | 30 | 7.1 | No pores, smooth | |
| 11 | 30 | 24.3 | Tough, medium sized pores, spongy | BC |
| 12 | 30 | 36.2 | Medium/large pores, uniform | BC |
| 13 | 30 | 1.3 | Very few pores, smooth (swollen) | |
| 14 | 30 | 0.7 | No pores, smooth | |
| 15 | 40 | 15.6 | Medium/large pores | BC |
| 16 | 45 | 17.6 | Very few pores, smooth | BC |
| 17 | 40 | 36.0 | Medium/large pores, uniform | BC |
| 18 | 35 | 35.7 | Large pores, uniform | BC |
| 19 | 30 | 23.7 | Very fine pores, uniform | BC |
| 20 | 30 | 0 | No pores, smooth | |
| 21 | 30 | 25.2 | Medium sized, pores, uniform | BC |
| 22 | 30 | 26.4 | Small medium, pores | |
| 23 | 30 | 30.4 | Few medium size pores, smooth | BC |
| 24 | 40 | 1.6 | Few pores, smooth (swollen) | |
| 25 | 35 | 22.5 | Fine pores, smooth | BC |
| 26 | 30 | 27.9 | Medium sized pores uniform | BC |
| 27 | 35 | 33.5 | Very large pores, non-uniform | |
| 28 | 30 | 0 | No pores, smooth | |
| 29 | 30 | 12.1 | Very fine pores, (swollen, crumbly) | |
| 30 | 35 | 21.5 | Very fine pores, uniform | BC |
| 31 | 30 | 30.7 | Large pores, uniform | BC |
| 32 | 35 | 32.2 | Very large pores, non-uniform | BC |
| 33 | 30 | 36.1 | Very fine pores, uniform | BC |
| 34 | 35 | 13.1 | Few pores, smooth | |
| 35 | 35 | 28.7 | Very fine pores (soft) | |
| 36 | 30 | 19.4 | Large pores, uniform | |
| 37 | 30 | 22.7 | Large pores, uniform | |
| 38 | 30 | 0 | No pores, smooth | |
| 39 | 30 | 0 | No pores, smooth | |
| 40 | 30.6 | 32.2 | Very fine pores, uniform | |
| 41 | 30 | 27.7 | Variable sized pores | BC |
| 42 | 5 | 26.8 | Variable sized pores, mostly fine | BC |
| 43 | 30 | 34.6 | Hard, medium size pores | BC |
| 44 | 35 | 29.8 | Hard, medium size pores | BC |
| 45 | 35 | 15.4 | Few pores, smooth | BC |
| 46 | 30 | 21.8 | Few pores, smooth | BC |
| 47 | 40 | 11.6 | Smooth, non-porous, splits easily | BC |
| 48 | 39 | 6.3 | Smooth, non-porous, splits easily | BC |
| 49 | 30 | 3.5 | Few pores | |
| 59 | 57 | 48.5 | Rigid, good strength | BC |
| 60 | 54.6 | 53.2 | Rigid, somewhat brittle | BC |
| 61 | 54.6 | 40.6 | Rigid, good strength | BC |
| 62 | 49.9 | 46.9 | Rigid, very brittle | BC |

Figure 1B:
Figure 1C:

SEM photomicrographs of the samples designated as 17, 15, BC1 and 3, and reproductions depicting these photomicrographs are set forth in FIGS. 1(a,b and c), 2(a,b and c), 3(a and b) and 4. Sample 17, shown in FIG. 1, has about 36% available oil and is fairly tough. The dark areas represent the voids from which oil was removed, while the light areas are the polyurethane (as is the case in all depictions herein of photomicrographs). These photomicrographs show that the MPL has rather large holes arranged in a nonuniform manner. The urethane is dispersed randomly around the holes which have a rather spherical conformation.

Figure 2A:
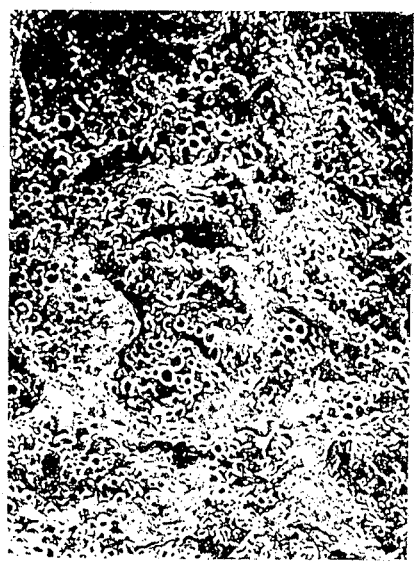
Figure 2B:
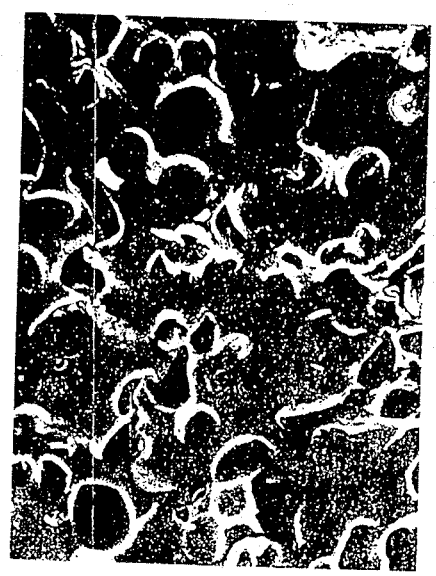
Figure 2C:
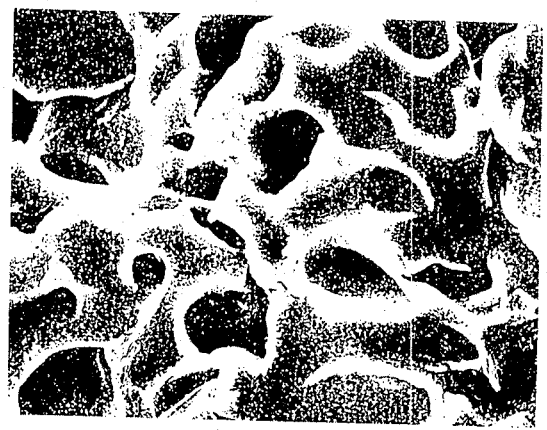

Sample 15, shown in FIG. 2, has about 16% available oil and it too is tough. FIG. 2 shows this MPL as having much smaller pores uniformly distributed throughout. Few of these pores appear to be interconnecting. The urethane appears as a solid polymer phase in which the pores are contained.

Figure 3A:
Figure 3B:

Sample BC1, shown in FIG. 3 shows a composition that has fairly large islands of polymer sintered together within vast areas of open voids.

Figure 4:
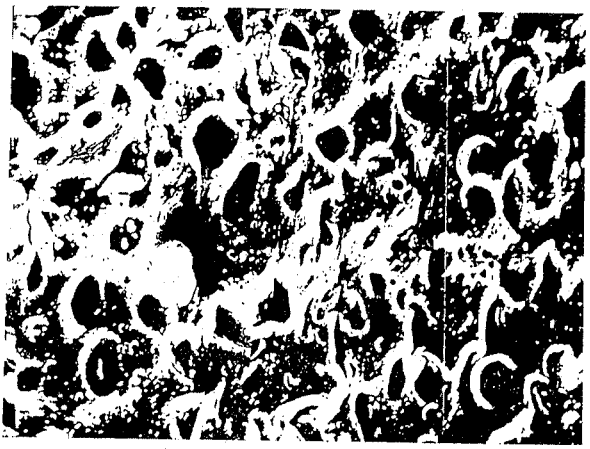
Figure 5:
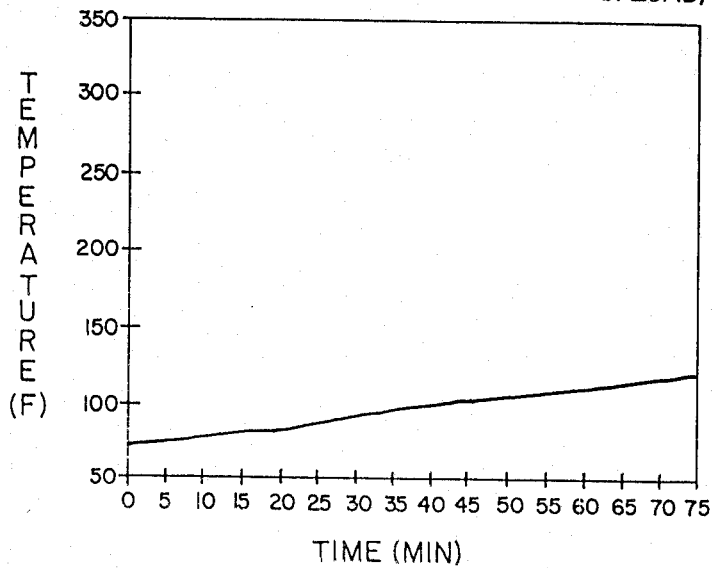
FIGS. 5 through 13 are graphs illustrating results of radial load tests for samples designated BC1 through BC8 and BC23 (reference), respectively.
Figure 6:
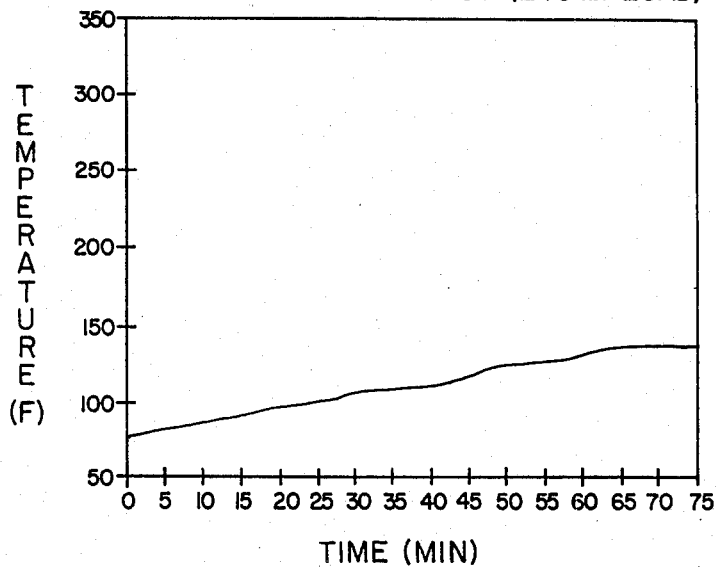
Figure 7:
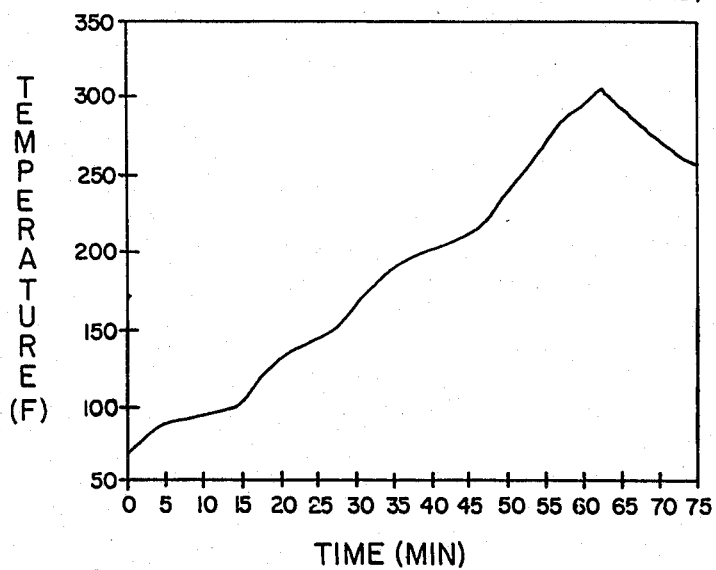
Figure 8:
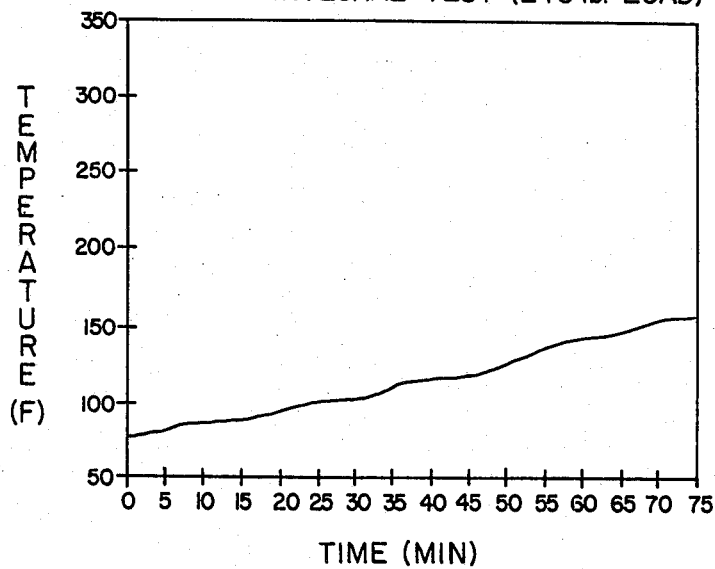
Figure 9:
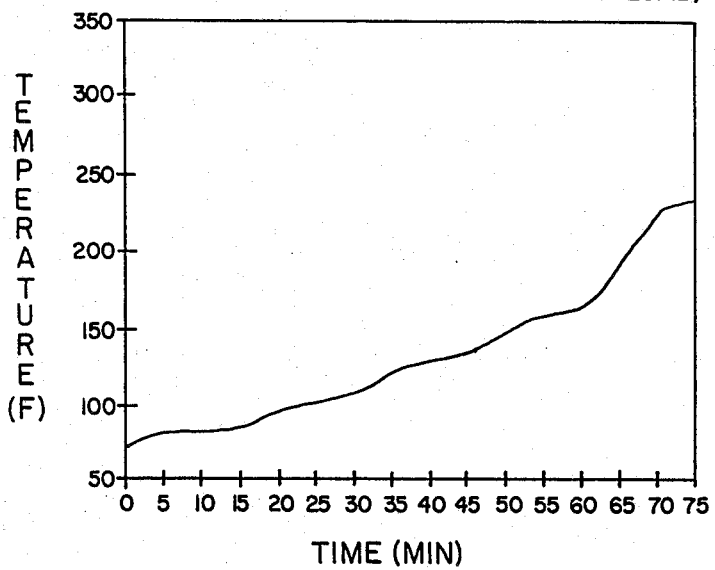
Figure 10:
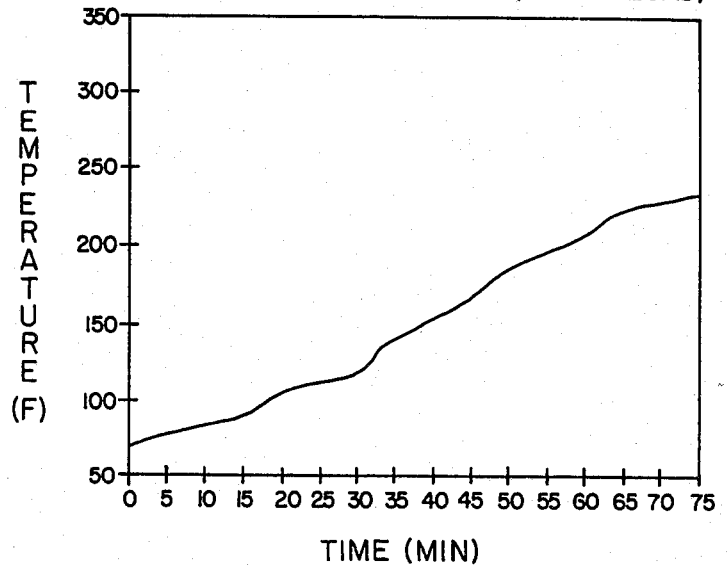
Figure 11:
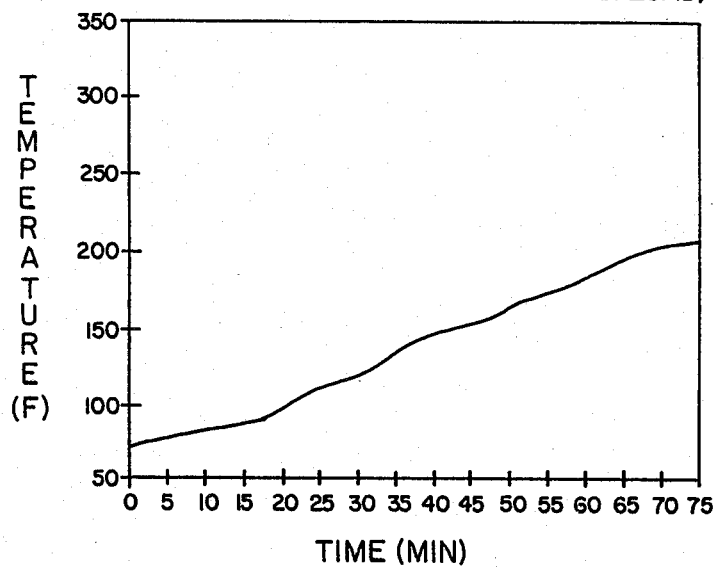
Figure 12:
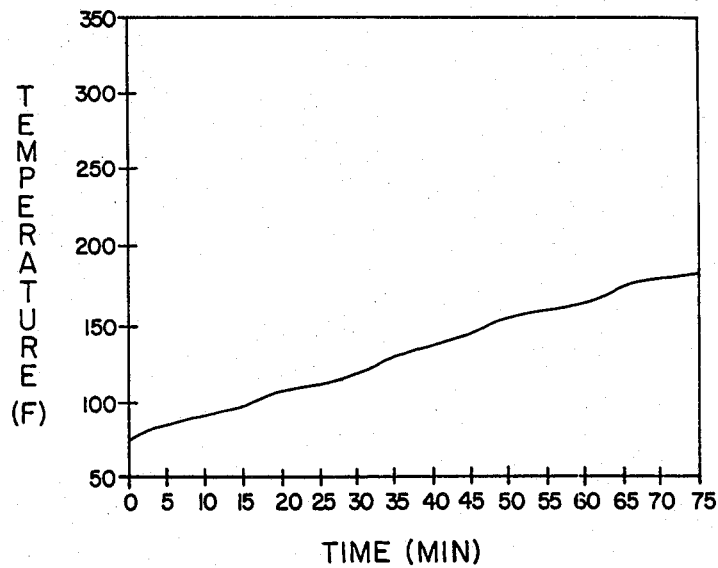
Figure 13:
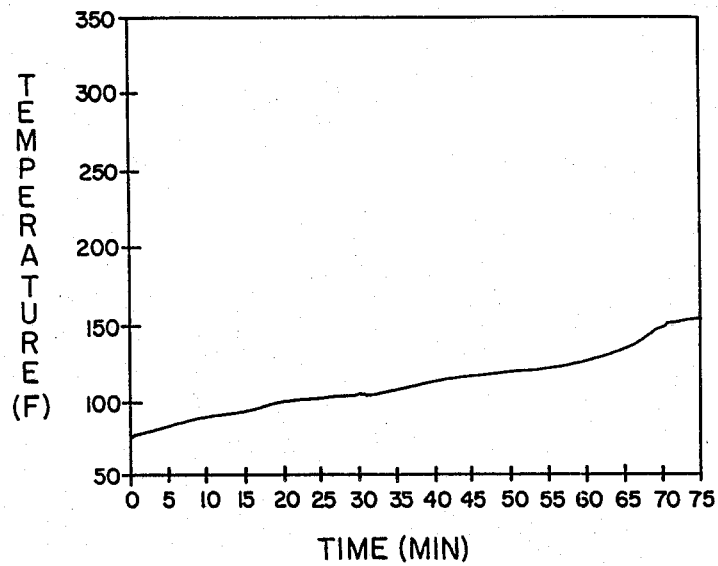

Sample 3, shown in FIG. 4, is a composition having only 5.3% extractable oil by weight. This sample appears to be a sponge with open pores, however, an MPL with this structure generally will not have enough available oil.

Intregal radial load tests and bearing tests were also performed for two sets of several compositions (which, as noted, are either identical to or vary slightly from compositions listed in Table I and II). For these tests, MPL bearings were poured in the laboratory for testing. Initially, bearing molds composed of RTV Silicon Mold Compound were made for each bearing type to be filled. The bearings were first degreased in hexane until they were free of any dirt or oil. Then they were sprayed with mold release and placed in an oven at 140° F. for at least one hour. Next they were dipped in the oil that was used in the formulation of that particular MPL. The excess oil as removed with a rag. After the bearings were placed in the silicon molds, the MPL's were mixed according to the standard procedure and were poured into the bearings. The filled bearings were then post cured at 200° F. for two hours.

Bearing tests, including an Integral Radial Load Test, were utilized to test the MPL bearings. For the Integral Radial Load Test, an SKF 6205J ball bearing was loaded on the Radial Load Tester with 240 lbs. Then the bearing was run according to the following schedule:

| Time (min.) | Speed (rpm) |
|---|---|
| 0-15 | 600 |
| 15-30 | 1000 |
| 30-45 | 1500 |
| 45-60 | 2000 |
| 60-75 | 2500 |

Time/temperature data was recorded on a strip chart recorder.

The results of these tests are set forth in Tables IIIA, IIIB, IVA and IVB as follows:

TABLE IIIA
INTEGRAL RADIAL LOAD TEST
Formulation

| Bearing Code | Isocyanate/phr | Polyol/phr | Catalyst/ml/hr | Oil/phr/% |
|---|---|---|---|---|
| BC1 | I-181/100.0 | W11-225/130.7 | C-2/4.0 | 25% E2964 75% Para/156.6/40% |
| BC2 | I-181/100.0 | W11-225/130.7 | C-2/2.0 | 25% E2964 75% Para/126.5/35% |
| BC3 | I-181/100.0 | D-2103/509.9 | C-2/4.0 | E2905/502.3/45% |
| BC4 | I-181/100.0 | D-2103/509.9 | C-2/12.0 | E2964/409.3/40% |
| BC5 | I-181/100.0 | D-2103/509.9 | C-2/12.0 | E2964/409.3/39% |
| BC6 | I-181/100.0 | D-2103/509.9 | C-2/12.0 | E2964/414.6/40% |
| BC7 | I-181/100.0 | D-2103/509.9 | C-2/12.0 | E2964/414.6/39% |
| BC8 | I-181/100.0 | W11-225/130.7 | C-2/1.5 | E2905/99.5/30% |
| BC9 | I-181/100.0 | TE-1500/378.1 | C-2/4.0 | Para/259.6/35% |
| BC10 | I-240/100.0 | TE-2000/405.1 | C-2/3.2 | Para/273.6/35% |
| BC11 | I-240/100.0 | W11-225/105.5 | C-2/1.0 | Para/112.4/35% |
| BC12 | I-240/100.0 | D-2070/103.3 | DC-1/6.4 | Para/112.9/35% |
| BC13 | I-240/100.0 | D-2070/103.3 | DC-1/6.4 | Para/89.4/35% |
| BC14 | E-410/100.0 | D-2103/199.9 | C-2/4.0 | 50% E2905/50% Para/162.5/35% |
| BC15 | E-410/100.0 | W11-112/102.6 | C-2/2.0 | E2905/75.7/27% |
| BC16 | E-410/100.0 | D-2070/50.3 | C-2/1.0 | 75% Para/25% E2905/65.3/30% |
| BC17 | E-410/100.0 | E-2873/120.2 | C-2/2.0 | Para/119.6/35% |
| BC18 | E-410/100.0 | E-2103/199.9 | C-2/4.0 | Para/129.4/30% |
| BC19 | I-181/20.0 | Rexnord 129-42/23.5 | In 129-42 | Amsoil /31.5/42% |
| BC20 | I-181/20.0 | Rexnord 129-42/23.5 | In 129-42 | DOS/65.2/60% |
| BC21 | I-181/20.0 | Rexnord 129-42/23.5 | In 129-42 | E2900/46.3/50% |
| BC22 | I-181/20.0 | Rexnord 129-42/23.5 | In 129-42 | E2905/-/40% |
| BC23 (REF) | PVC | Thermo Plastic | — | Para/30% |

TABLE IIIB
INTEGRAL RADIAL LOAD TEST
Evaluation

| Bearing Code | Mormology Similar to | Additive/phr (if any) | Tmax °F. |
|---|---|---|---|
| BC1 | 17 | — | 137 |
| BC2 | 17 | — | 150 |
| BC3 | 16 | — | 304 |
| BC4 | 47 | Van Lube 73 (2% of oil) NA Sul BSN (0.4% of oil) | 179 |
| BC5 | 48 | MoS$_2$/21.0 | 229 |
| BC6 | 15 | — | 243 |
| BC7 | — | Van Lube 73 (2% of oil) Na Sul BSN (0.4% of oil) MoS$_2$/21.0 | 202 |
| BC8 | 12 | — | 178 |
| BC9 | 18 | — | 128 |
| BC10 | 7 | — | 126 |
| BC11 | 6 | — | 159 |
| BC12 | 32 | — | 140 |
| BC13 | 31 | — | 127 |
| BC14 | 25 | — | 261 |
| BC15 | 21 | — | Broke up |
| BC16 | 26 | — | 137 |
| BC17 | 45 | — | 180 |
| BC18 | 19 | — | 241 |
| BC19 | — | — | 127 |
| BC20 | — | — | 116 |
| BC21 | 60 | MoS$_2$/2.8 | Broke up |
| BC22 | 62 | — | Broke up |
| BC23 (REF) | — | — | 138 |

TABLE IVA
BEARING TEST
Formulation

| Sample Code | Isocyanate (100 pgr) | Polyol (pgr) | Catalyst (pgr) | Oil (pgr) |
|---|---|---|---|---|
| BC1 | I-181 | W 11-225/130.7 | C-2/4.0 | 25% E2964 75% Para/156.5 |
| BC24 | I-181 | W 11-225/130.7 | C-2/1.5 | E2905/99.5 |
| BC25 | I-181 | W 11-225/130.7 | 33LV/2.5 | Para/126.4 |
| BC11 | I-240 | W 11-225/105.5 | C-2/1.0 | Para/112.4 |
| BC26 | I-240 | W 11-225/105.5 | 3LV/1.5 | Para/102.8 |
| BC9 | I-181 | T-1500/378.1 | C-2/4.0 | Para/259.6 |
| BC10 | I-240 | T-2000/405.0 | C-2/3.2 | Para/273.6 |
| BC16 | E-410 | D-2070/50.3 | C-2/1.0 | 25% E2905 75% Para/65.3 |
| BC18 | E-410 | D-2103/199.9 | C-2/4.0 | Para/129.4 |
| BC27 | I-181 | W 11-112/261.6 | C-2/3.0 | E2905/156.7 |
| BC28 | I-181 | Rexnord 129-42/23.1 g | In 129-42 | E2935/60 |

TABLE IVB
BEARING TEST
Evaluation

| Sample Code | % Oil In | % Oil Extracted | Appearance | Bearing Test T$_{max}$ (°F.) |
|---|---|---|---|---|
| BC1 | 40% | 36.0% | Semi-spongy good strength | 137 |
| BC24 | 30% | 36.2% | Semi-spongy good strength | 185 |
| BC25 | 35% | 29.8% | Rigid, good strength | 152 |
| BC11 | 35% | 29.2% | Spongy, fair/good strength | 159 |
| BC26 | 33% | 26.8% | Semi-rigid, very good strength | 183 |
| BC9 | 35% | 35.7% | Spongy, fair/good strength | 128 |
| BC10 | 35% | 32.8% | Spongy, fair/good strength | 126 |

TABLE IVB-continued
BEARING TEST
Evaluation

| Sample Code | % Oil In | % Oil Extracted | Appearance | Bearing Test $T_{max}$ (°F.) |
|---|---|---|---|---|
| BC16 | 35% | 27.9% | Semi-spongy, good strength | 137 |
| BC18 | 30% | 23.7% | Semi-spongy, very good strength | 241 |
| BC27 | 30% | 24.3% | Spongy, good strength | 152 |
| BC28 | 57% | 48.5% | Rigid, good strength | 112 |

Results of load tests for samples designated as BC1 through BC8 and BC23 (ref) are shown in FIGS. 5 through 13.

When comparing polyols, it was found that the two polyester polyols (Witco products) utilized had a greater tendency to form thermoset MPLs with available oil than did the polyether polyols. Also, in formulations in which there was available oil, the polyesters tended to form tougher thermoset MPLs.

With respect to epoxies, it has been found that Shell Epon 828 Epoxy Resin in certain proportions to Versamid 150 as a curing agent forms a matrix with interconnected microscopic pores that receive and retain polyalphaolefin oil or paraffinic oil, with the combination of Epon 828 epoxy resin and Versamid 150 having been utilized to successfully form such a matrix capable of receiving and retaining lubricating oil as above specified. Other epoxy resins, such as Dow 331 Epoxy Resin, was tried in conjunction with Versamid 150 but the lubricating oil was found to separate from the epoxy matrix.

Table V shows the results achieved utilizing the above-identified Epon 828 epoxy resin, as follows:

TABLE V
EPOXY FORMULATIONS

| Sample No. | Epoxy 828 (g) | Versamid (g) | PAO Oil (g) | PAR. Oil (g) | Observations |
|---|---|---|---|---|---|
| 397 | Epon 828/100 | 150 | | 50 | Candidate |
| 398 | Epon 828/100 | 150 | | 60 | Candidate |
| 399 | Epon 628/100 | 150 | | 70 | Candidate |
| 400 | Epon 828/100 | 150 | 62 | | Candidate |
| 401 | Epon 828/100 | 40 | 50 | | Oil Separation |
| 402 | Epon 828/100 | 40 | | 50 | Oil Separation |
| 403 | Epon 828/100 | 60 | 50 | | Oil Separation |
| 404 | Epon 828/100 | 60 | | 50 | Oil Separation |
| 405 | Epon 828/100 | 100 | 50 | | Oil Separation |
| 406 | Epon 828/100 | 100 | | 50 | Oil Separation |
| 407 | Epon 828/100 | 150 | 50 | | Oil Separation |
| 408 | Epon 828/100 | 150 | | 80 | Slight Separation |
| 409 | Epon 828/100 | 150/ACC 399 20 g | | 70 | Oil Separation |
| 410 | Epon 828/100 | 150 | 70 | | Oil Separation |
| 411 | Epon 828/100 | 150 | 5 g | Si oil | Color Separation |
| 412 | Dow-331/100 | 100 | 50 | | Oil Separation |
| 413 | Dow-331/100 | 100 | | 50 | Oil Separation |
| 414 | Dow-331/100 | 150 | 50 | | Oil Separation |
| 415 | Dow-331/100 | 150 | | 50 | Oil Separation |

Figure 14:
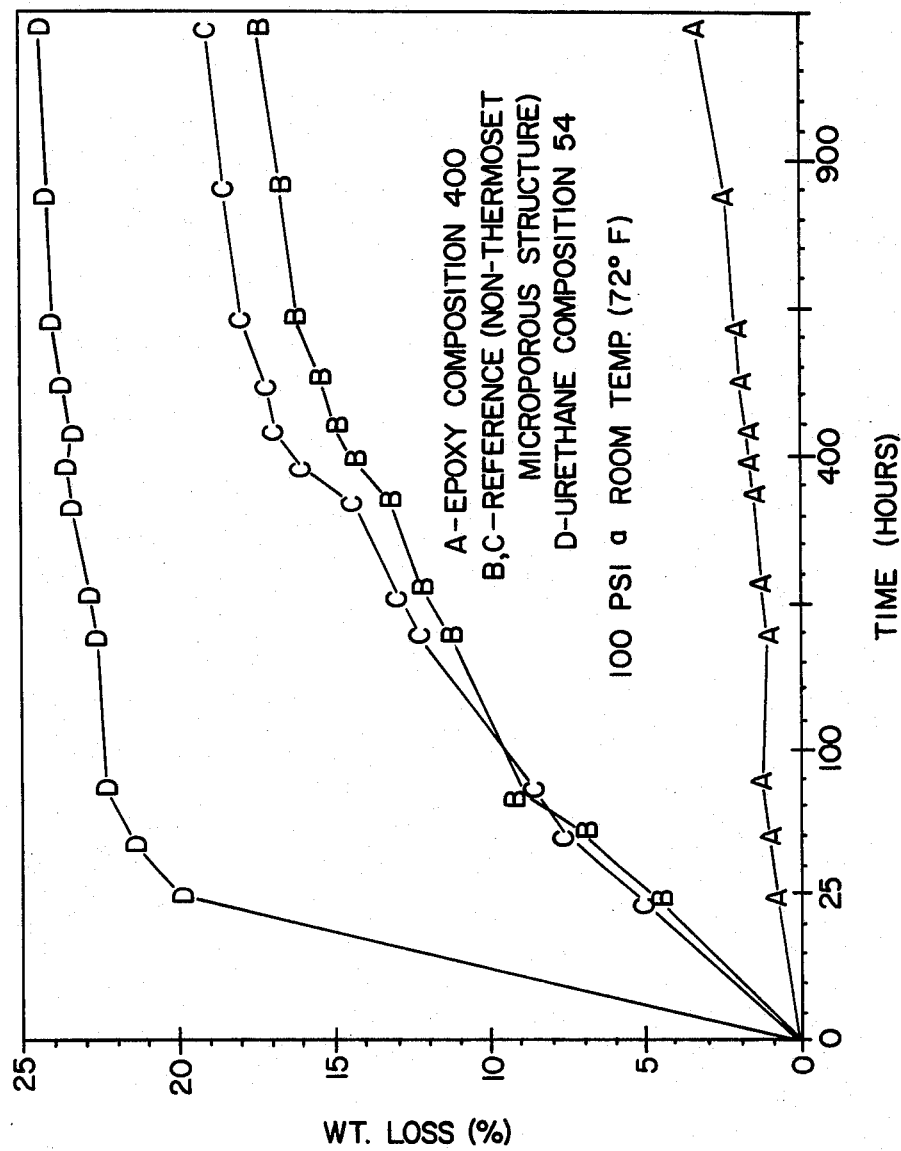
FIG. 14 is a graph illustrating microporous bleed rate for the epoxy composition designated 400, and for the polyurethane composition designated 54, as compared with a reference non-thermoset microporous structure.

FIG. 14 is a graph illustrating microporous bleed rate (which is a test in which a small plug of MPL is compressed under a steady load and the amount of oil squeezed out is measured (weight) as a function of time) for an epoxy composition (designated 400), a polyurethane composition, (designated 54), and a typical microporous structure (not using a thermosetting polymer) for reference purposes.

With respect to polyesters, silicones and a hybrid system having a polyester resin and a polyether elastomer, samples were realized using the formulations as set forth in TABLE VI as follows:

TABLE VI
POLYESTER SILICONE AND HYBRID FORMULATIONS

| Sample No. | Elements | Results |
|---|---|---|
| 416 | Silicone (RTV664A-GE)/ 33% Silicone (RTV664B-GE/ 3.3 g Silicone Fluid (SF96-350-GE)/100 g | System compatible- placed in oven at 250%° F. for 20 minutes- oil could be squeezed out and also migrated to surface. |
| 417 | Polyester (32-367 Reichhold)/60 g Methyl Ethyl Ketone Peroxide (MEKP)/2 g Hydrin (10xl B. F. Goodrich)/149 Emery 2905 Synthetic Oil (Dimer Acid Diester Oil)/40 g | Sample Hard - none or little oil could be squeezed out |
| 418 | Sample 417/30 g Celogen (OT, Uniroyal Chemical)/4 g | Placed in oven at 300° F. for 9 minutes- Sample foamed- Some oil could be squeezed out. |
| 419 | Polyester (32-367 Reichhold) 60 g MEKP/2 g Hydrin 10xl/14 g Emergy 2905/40 g | Sample Hard - No oil |
| 420 | Sample No. 419/40 g Celogen OT/5 g | In oven at 300+ F. for 9 minutes - Sample foamed - Cooled to room temperature - oil could be squeezed out. |
| 421 | Polyester (32-367 Reichhold)/60 g MEKP/2 g Hydrin 10xl/14 g Emery 2905/52 g | Sample hard - very little oil could be squeezed out. |
| 422 | Sample No. 421/40 g Celogen OT/5 g | In oven 300° F. for 9- Sample foamed-Cooled- oil could be squeezed out. |
| 423 | Polyester (32-367 Reichhold) 30 g Silicone oil (SF 96- 350-GE) 17 g MEKP/2 g Luperfoam (329 - Pennwalt Co.)/1.5 g | Cured at 72° F.- oil could be squeezed out. |

Figure 15:
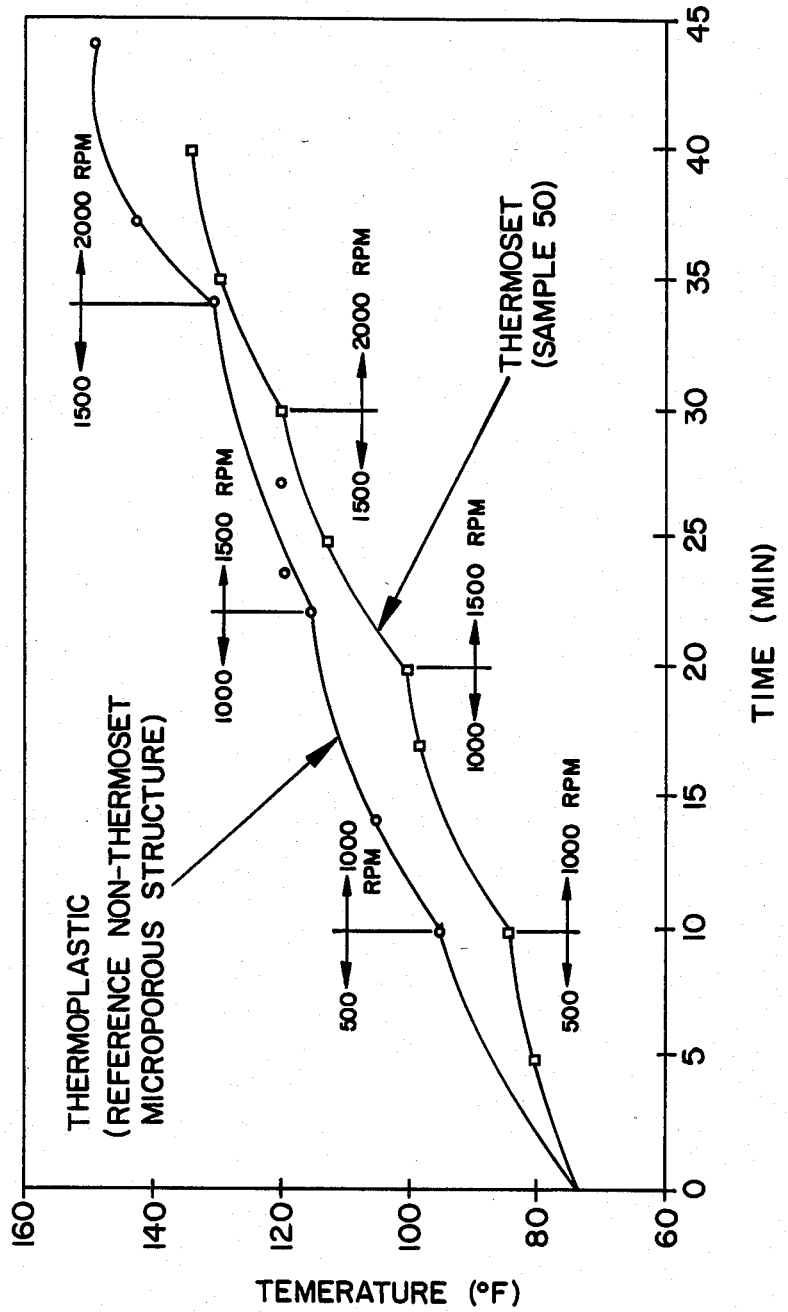
FIG. 15 is a graph showing bearing test results for time vs. temperature for a thermoset microporous polymer lubricating composition (composition designated by sample code 50) as compared to a typical thermoplastic MPL.

Specific applications of several of the foregoing compositions have been made for illustrative purposes according to the following examples:

Example 1 (Composition Sample No. 50). A commercial polyurethane casting resin system (Nordbak 90A) was obtained from Rexnord Resin Systems Division. To 32 parts by weight of the polyol (Part A) were added 70 parts of an ester-based motor oil (Anderol 10W-40) plus 5 parts of an amine catalyst (Air Products Dabco DC-1) and 2 parts of a chain extender (hydroquinone). The ingredients were mixed and added to 20 parts of the isocyanate (Part B) and were mixed again. While the mixture was still liquid, it was poured into a ball bearing (SKF 6205) to fill all the internal voids within the bearing. After curing at room temperature, the composition formed a flexible, black solid containing 54.3% oil, which exuded this oil when pressure was applied to the composition. The bearing was operated under a 240 pound radial load on a tester which simulated actual operating conditions in useful machines. The rotational speed of the bearing was increased from 500 to 2000 revolutions per minute over a period of 40 minutes and the bearing temperature was monitored. The bearing ran smoothly without distress and at no time did the bearing temperature rise above 140° F. This performance compared favorably with a thermoplastic MPL lubricated bearing which was tested under similar conditions, as shown in FIG. 15.

Example 2 (Composition Sample No. BC-1). A lubricating oil blend comprising 75% by weight of a trimethylol propane trioleate synthetic oil and 25% of a hydrocarbon mineral oil (325 solvent neutral paraffinic oil) was combined with a hydroxyl terminated linear polyester polyol (Witco Fomrex 11-225) in the ratio of 156.6 parts by weight of the oil to 130.7 parts of the polyol. To this were added 4.0 parts of a stannous octoate catalyst (Witco Fomrez C-2) and the ingredients were thoroughly mixed. This blend was added to 100 parts by weight of a modified diphenylmethane diisocyanate (Upjohn Isonate 181) and the blend was mixed thoroughly and vigorously and poured into a ball bearing as in Example 1. When cured, the MPL thus formed had 36% of the initial 40% oil available to perform lubricating functions, as determined by extracting the oil with a solvent bath and weighing the remaining polyurethane matrix. The bearing was tested as in Example 1 and ran smoothly and at temperatures less than 137° F.

Example 3 (Composition Sample No. BC-4). A blend was made of 409.3 parts by weight of the synthetic oil from Example 2 and 509.9 parts of a polyether triol (Dow Voranol 2103) and 12.0 parts of the catalyst from Example 2. To the oil prior to blending with the polyol and catalyst were added 2% antimony dialkyldithiocarbamate (Vanderbilt Van Lube 72), a lubrication performance additive and 0.4% barium sulfonate rust inhibiter. The blend was added to 100 parts by weight of the isocyanate from Example 2 and poured into a 6205 ball bearing. The bearing was tested as in Example 1 and ran smoothly with a maximum temperature of 179° F.

Example 4 (Composition Sample No. BC-16). A blend of lubricating oils comprising 75% of the hydrocarbon mineral oil from Example 2 and 25% of a dimer acid diester synthetic oil (Emery 2905) was formed and blended with a polyether triol (Dow Voranol 2070) in the ratio of 65.3 parts by weight of oil to 50.3 parts of the triol. To this was added 1.0 parts by weight of the catalyst from Example 2. The ingredients were blended and mixed with 100 parts of a methylene diisocyanate (Mobay Multrathane E-410) with a high molecular weight. The mixture was poured into a 6205 ball bearing and tested when cured as in Example 1. The bearing operated smoothly with a maximum temperature of 137° F.

Example 5 (Composition Sample No. BC-20). A blend of 126.4 parts by weight of the hydrocarbon oil from Example 2 and 130.7 parts of the polyol from Example 2 were blended with 2.5 parts of and amine catalyst (Air Products Dabco 33 LV). These were blended with 100 parts of the isocyanate from Example 2 and were poured into a 6205 ball bearing. The thermoset MPL thus formed had good strength and was a rigid solid. The bearing was tested as in Example 1 and ran smoothly with a maximum temperature of 150° F.

Example 6 (Composition Sample No. BC-22). A blend of 156.7 parts by weight of the synthetic oil from Example 4 (Emery 2905) and 261.6 parts of a poly (diethylene adipate) polyol (Witco Fomrez 11-112) were added to 3.0 parts of the catalyst from Example 2 (Witco Fomrez C-2). These were added to 100 parts of the isocyanate from Example 2 and the mixture was poured into a 6205 ball bearing. The useful oil content was measured to be 24.3% by weight of the thermoset MPL and the bearing ran smoothly with a maximum temperature of 152° F. when tested as in Example 1. The thermoset MPL was a spongy solid with good strength.

As can be appreciated from the foregoing, this invention provides a novel thermoset microporous polymer lubricating composition, as well as a novel method for forming such a composition.

What is claimed is:

1. A thermoset microporous polymer lubricating composition, comprising:
   a lubricating oil; and
   a thermosetting polymer formed into a matrix having interconnected microscopic pores to receive said lubricating oil during formation of said matrix and with said matrix having sufficient structural integrity to thereafter retain said lubricating oil and to release said retained lubricating oil from said matrix during subsequent use of said composition for lubricating elements external to said matrix.

2. The composition of claim 1 wherein said interconnected pores of said matrix have pore dimensions sufficient to receive and retain a quantity of lubricating oil equal to at least about 30% of said thermosetting polymer.

3. The composition of claim 1 wherein said interconnected pores have a pore diameter of between about 1 and 10 microns.

4. The composition of claim 1 wherein said lubricating oil comprises between about 30% and 80% of said thermosetting polymer.

5. The composition of claim 1 wherein said thermosetting polymer is selected from the group consisting of a urethane, an epoxy, a polyester, a silicone, and a hybrid system having a polyester resin and a polyester elastomer.

6. The composition of claim 1 wherein said composition includes a surface energy modifier for acting on the surfaces of said matrix and oil to enhance said pore formation and receipt of said oil therein.

7. A thermoset microporous polymer lubricating composition, comprising:
   a lubricating oil;

a thermosetting polymer comprising between about 30% to 95% of said lubricating oil, said thermosetting polymer formed into a matrix having interconnected pores with pore diameter of between about 1 and 10 microns to receive said lubricating oil during formation of said matrix and with said matrix having sufficient structural integrity to thereafter retain said lubricating oil and to release said retained lubricating oil from said matrix during subsequent use of said composition for lubricating elements external to said matrix; and a surface energy modifier for acting on the surfaces of said matrix and said oil to thereby enhance creation of said interconnected pores in said matrix during formation thereof.

8. The composition of claim 7 wherein said surface energy modifier is one of an emulsifier and a foaming agent.

9. A thermoset microporous polymer lubricating composition, comprising:

a polyurethane matrix formed from an isocyanate, a polyol, and a catalyst capable of interacting to form interconnected microscopic pores in said matrix at formation of said matrix; and a lubricating oil compatible with said matrix and received in said pores of said matrix during formation of said matrix whereby said lubricating oil is maintainable in said matrix and lubricating oil so retained is releasable from said matrix during subsequent use of said composition for lubricating elements external to said matrix.

10. The composition of claim 9 wherein said isocyanate is selected from the group consisting of a methylene diisocyanate, a tolulene diisocyanate, a hexamethylene diisocyanate, and a naphthalene diisocyanate.

11. The composition of claim 9 wherein said polyol is selected from the group consisting of an ether, an ester of adipic acid, and phthalic anhydride.

12. The composition of claim 9 wherein said polyol also is selected from the group consisting of glycol, triol, hydroquinone and pentaerythritol as reaction modifiers.

13. The composition of claim 9 wherein said catalyst is selected from the group consisting of an amine and a metal salt.

14. The composition of claim 13 wherein said amine is selected from the group consisting of triethyl amine, triethylene diamine and aniline, and wherein said metal salt is selected from the group consisting of stannous chloride, di-n-butyl tin dilaurate, stannous octoate and zinc napthanate.

15. The composition of claim 9 wherein said lubricating oil is selected from the group consisting of a mineral oil, a synthesized hydrocarbon, an ester-based oil, and a silicone oil.

16. The composition of claim 6 wherein said composition includes a surface energy modifier.

17. The composition of claim 16 wherein said surface energy modifier is one of an emulsifier and a foaming agent.

18. The composition of claim 9 wherein said composition includes additives to modify the mechanical, physical and lubricating properties of said composition.

19. A thermoset microporous polymer lubricating composition, comprising:

a polyurethane matrix formed from a urethane resin made by combining a methylene diisocyanate, a polyol and a catalyst, said matrix having interconnected microscopic pores therein with the diameter of said pores being between about 1 and 10 microns; and a lubricating oil received and retained in said microscopic pores of said matrix, with said composition including about 30% to 60% lubricating oil and 40% to 70% urethane resin, and with said retained lubricating oil being releasable from said matrix during subsequent use of said composition for lubricating elements external to said matrix.

20. The composition of claim 19 wherein said polyol is selected from the group consisting of an ether, an ester of adipic acid, and phthalic anhydride, wherein said catalyst is selected from the group consisting of an amine and a metal salt, and wherein said lubricating oil is selected from the group consisting of mineral oil, a synthesized hydrocarbon, an ester-based oil, and a silicone oil.

21. A method for forming a thermoset microporous polymer lubricating composition, said method comprising:

providing a lubricating oil;

providing a thermosetting polymer capable of being formed into a matrix;

mixing said lubricating oil with said thermosetting polymer to form a mixture thereof;

placing said mixture into a forming area; and allowing said mixture to cure at said forming area to form thereat a mixture from said polymer with said matrix having interconnected pores therein that receive and retain said lubricating oil, and with said retained lubricating oil being releasable during subsequent use of said composition for lubricating elements external to said matrix.

22. The method of claim 21 wherein said method includes adding a surface energy modifier to said mixture to enhance formation of said pores.

23. The method of claim 21 wherein said mixture is cured in a mold.

24. The method of claim 21 wherein said mixture is cured in a utilization device.

25. The method of claim 24 wherein said utilization device is one of a bearing, a wire rope, and a power transmission device.

26. A method for forming a thermoset microporous polymer lubricating composition, said method comprising:

providing a lubricating oil;

providing an isocyanate, a polyol and a catalyst capable of reacting to form a matrix having interconnected microscopic pores;

mixing said lubricating oil with said polyol and catalyst to form an initial mixture;

mixing said first mixture with said isocyanate to form a final mixture;

placing said final mixture into a forming area; and allowing said final mixture to cure at said forming area to form thereat said matrix having said interconnected pores filled with said lubricating oil, said lubricating oil being retained in said interconnected pores and being releasable during subsequent use of said composition for lubricating elements external to said matrix.

27. The method of claim 26 wherein said method comprises providing said isocyanate and polyol near stoichiometric ratios of isocyanate to polyol, and providing lubricating oil in the range of about 30% to 60% of said isocyanate, polyol and catalyst.

28. The method of claim 26 wherein said isocyanate, polyol and catalyst are selected to cause the microscopic pores of said matrix to be of sufficient size to receive a sufficiently large quantity of lubricating oil in said pores for adequate lubricating purposes during use of said composition but without adversely effecting the structural integrity of said matrix so as to cause premature release of lubricating oil from said matrix.

29. The method of claim 26 wherein said final mixture is cured in a utilization device that is one of a bearing, a wire rope, and a power transmission.

30. The method of claim 26 wherein said method includes adding a surface energy modifier, that is one of an emulsifier and a foaming agent, to said initial mixture to enhance subsequent formation of said pores.

* * * * *